United States Patent
Miller et al.

(10) Patent No.: US 10,846,308 B2
(45) Date of Patent: Nov. 24, 2020

(54) PRIORITIZED DETECTION AND CLASSIFICATION OF CLUSTERS OF ANOMALOUS SAMPLES ON HIGH-DIMENSIONAL CONTINUOUS AND MIXED DISCRETE/CONTINUOUS FEATURE SPACES

(71) Applicant: Anomalee Inc., State College, PA (US)

(72) Inventors: David Jonathan Miller, State College, PA (US); George Kesidis, State College, PA (US)

(73) Assignee: Anomalee Inc., State College, PA (US)

( * ) Notice: Subject to any disclaimer, the term of this patent is extended or adjusted under 35 U.S.C. 154(b) by 0 days.

(21) Appl. No.: 15/731,753

(22) Filed: Jul. 26, 2017

(65) Prior Publication Data
US 2019/0188212 A1    Jun. 20, 2019

Related U.S. Application Data

(60) Provisional application No. 62/494,093, filed on Jul. 27, 2016.

(51) Int. Cl.
*H04L 29/06* (2006.01)
*G06F 16/28* (2019.01)
(Continued)

(52) U.S. Cl.
CPC ........... *G06F 16/285* (2019.01); *G06N 7/005* (2013.01); *G06N 20/00* (2019.01)

(58) Field of Classification Search
None
See application file for complete search history.

(56) References Cited

U.S. PATENT DOCUMENTS

| 8,544,087 | B1 * | 9/2013 | Eskin | H04L 41/06 726/22 |
| 8,887,281 | B2 * | 11/2014 | Honig | H04L 63/14 726/23 |

(Continued)

OTHER PUBLICATIONS

Veracini, Tiziana et al. Fully Unsupervised Learning of Gaussian Mixtures for Anomaly Detection in Hyperspectral Imagery. 2009 Ninth International Conference on Intelligent Systems Design and Applications. https://ieeexplore.ieee.org/stamp/stamp.jsp?tp=&arnumber=5365000 (Year: 2009).*

Qiu, Zhicong et al. Detecting clusters of anomalies on low-dimensional feature subsets with application to network traffic flow data. 2015 IEEE 25th International Workshop on Machine Learning for Signal Processing (MLSP). https://ieeexplore.ieee.org/stamp/stamp.jsp?tp=&arnumber=7324326 (Year: 2015).*

(Continued)

*Primary Examiner* — Jeremiah L Avery
(74) *Attorney, Agent, or Firm* — Mark D. Spiller

(57) ABSTRACT

This patent concerns novel technology for detection of zero-day data classes for domains with high-dimensional mixed continuous/discrete feature spaces, including Internet traffic. Assume there is a known-class database available for learning a null hypothesis that a given new batch of unlabeled data does not contain any data from unknown/anomalous classes. A novel and effective generalization of previous parsimonious mixture and topic modeling methods is developed. The novel unsupervised anomaly detector (AD) acts on a new unlabeled batch of data to either identify the statistically significant anomalous classes latently present therein or reject the alternative hypothesis that the new batch contains any anomalous classes. The present AD invention can be applied in an on-line setting. Labeling (by a human expert or by other means) of anomalous clusters provides new supervised data that can be used to adapt an actively learned classifier whose objective is to discriminate all the classes.

5 Claims, 7 Drawing Sheets

(51) Int. Cl.
*G06N 7/00* (2006.01)
*G06N 20/00* (2019.01)

(56) References Cited

U.S. PATENT DOCUMENTS

| | | | | |
|---|---|---|---|---|
| 2012/0185415 A1* | 7/2012 | Chenthamarakshan | ................... | G06F 16/355 |
| | | | | 706/12 |
| 2012/0284791 A1* | 11/2012 | Miller | ................... | G06N 7/005 |
| | | | | 726/22 |
| 2015/0379429 A1* | 12/2015 | Lee | ................... | G09B 5/00 |
| | | | | 706/11 |
| 2016/0078367 A1* | 3/2016 | Adjaoute | ................. | G06F 16/215 |
| | | | | 706/12 |

OTHER PUBLICATIONS

Mahyari, Arash Golibagh; Aviyente, Selin. Multi-Scale Anomaly Detection in Complex Dynamic Networks. 2013 IEEE Global Conference on Signal and Information Processing. https://ieeexplore.ieee.org/stamp/stamp.jsp?tp=&arnumber=6736950 (Year: 2013).*

Rosario, Dalton S. Highly effective logistic regression model for signal (anomaly) detection. 2004 IEEE International Conference on Acoustics, Speech, and Signal Processing. https://ieeexplore.ieee.org/stamp/stamp.jsp?tp=&arnumber=1327236 (Year: 2004).*

Laxhammar, Rikard; Falkman, Göran. Online Learning and Sequential Anomaly Detection in Trajectories. IEEE Transactions on Pattern Analysis and Machine Intelligence, vol. 36, Issue: 6. https://ieeexplore.ieee.org/stamp/stamp.jsp?tp=&arnumber=6598676 (Year: 2014).*

* cited by examiner

PRIORITIZED DETECTION AND CLASSIFICATION OF CLUSTERS OF ANOMALOUS SAMPLES ON HIGH-DIMENSIONAL CONTINUOUS AND MIXED DISCRETE/CONTINUOUS FEATURE SPACES

RELATED APPLICATION

This application claims the benefit of U.S. Provisional Patent Application No. 62/494,093, by inventors David Jonathan Miller and George Kesidis, entitled "Prioritized Detection and Classification of Clusters of Anomalies on High-dimensional Mixed Discrete/Continuous Feature Spaces with Application to Intrusion Detection and Topic Discovery," filed 27 Jul. 2016, which is incorporated herein by reference.

BACKGROUND

Field of the Invention

This disclosure relates to the detection of never before seen behavioral clusters in large and complicated observed datasets, also known as group (cluster) anomaly detection or detection of zero-day activity. The application domains include but are not limited to cyber security based on datasets, e.g., consisting of Internet packet flows where the anomalous activity could be a new cyber attack, as well as detection of anomalous content in document, image, and multi-sensor datasets.

Related Art

Anomaly detection (AD) is the problem of identifying items or patterns which do not conform to normal or expected behavior. For instance, anomaly detection techniques can be used to detect credit card fraud, insurance fraud, and network intrusions. Such techniques can also be used in scientific domains to detect new physical phenomena.

Methods that simply detect individual anomalous samples from a set of samples will not infer that some anomalies have a common statistical character. For instance, if about 100 anomalous flows are detected in a daily batch of babout about 10,000 network traffic flows, it is very time-consuming for a network administrator to examine each of these anomalous flows. The inability to reliably prioritize and cogently represent anomalies is a major problem which hampers many AD systems. Furthermore, if each flow is measured by a high-dimensional feature vector, an anomaly may only manifest on a very small subset of the measured features, and hence evade detection.

Hence, what is needed are techniques and systems for detecting anomalous clusters in large and complicated datasets without the above-described problems of existing approaches.

SUMMARY OF THE INVENTION

It is an object of the present invention to provide a system for and a means of prioritized detection of clusters of anomalous samples in an unlabeled data batch, each characterized by its samples being anomalous on the same (in general low-dimensional) subset of the full (high-dimensional) feature set. The present invention is applicable to various types of data that require high-dimensional feature representation, including image databases (possibly with text captioning), document and/or email databases (possibly with embedded or associated images), image/video tracking databases, biomedical and bioinformatics datasets, and end-host activity logs and network traffic flow datasets for purposes of intrusion detection. Most standard AD approaches apply hypothesis testing separately to each individual sample, i.e. they do not detect clusters (groups) of anomalies. Moreover, standard methods, including existing group AD methods, generally assess the atypicality of individual samples on the full measured feature space. However, suppose there are one or more unknown (latent) classes present in a captured data batch, i.e., each a subset of samples that were all generated by the same alternative process (e.g., in an intrusion detection setting, the same zero-day attack, such as a new bot), relative to the processes generating the classes that are known. A method that simply detects individual anomalous samples relative to known classes will not infer that some anomalies have a common statistical character—such inference may be of great practical value.

Suppose e.g., that about 100 anomalous flows are detected in a daily batch of about 10.000 network traffic flows. It is very time-consuming for a network administrator to examine each of these anomalous flows. Moreover, unless some are much more statistically significant than the rest, one cannot reliably rank-prioritize detections, so that a human operator can focus attention on a subset that is both manageably small and likely to contain the truly actionable anomalies. It is this inability to reliably prioritize and, especially, to cogently represent anomalies which practically hampers many AD systems. Rather than making 100 individual detections, the present invention's AD can infer e.g., that 10 samples are all atypical with respect to the same small subset of features, and thus likely originate from a common (unknown) source. Moreover, if these 10 samples were only weakly atypical individually, a standard individual AD technique may fail to detect these samples, whereas they will tend to exhibit a higher degree of atypicality when considered jointly as a group (cluster)—it is quite unlikely by chance that a cluster of samples will manifest atypicality on the same (small) feature subset, especially when the feature dimensionality is high. A network administrator can feasibly examine a single such cluster of flows, rather than examining many individual flows, and a low-dimensional anomalous signature is in general much more interpretable to a network administrator than a high-dimensional signature. Based on the low-dimensional anomalous signature of the cluster (as well as other information sources such as previously seen bots or information captured from honeynets), the network administrator may be able to label this cluster either as an existing application class or potentially as a new type of attack exploit.

Some key innovations in the present invention include: i) Detecting clusters of anomalous samples on low-dimensional feature subsets—Such joint detections have greater statistical significance and in general are more convincing than individual sample detections. While some group (cluster) anomaly detection methods have been previously proposed, most such methods assess atypicality on the full feature space. Some do assess atypicality on salient feature subsets, but this is only applicable to discrete feature spaces. The present invention is applicable both to continuous-valued feature spaces and to mixed continuous and discrete-valued feature spaces, ii) Extending parsimonious mixture modeling frameworks from unsupervised learning to address the problem of group (cluster) anomaly detection—Parsimonious mixtures are separately employed in our method both for modeling the null hypothesis as well as the alternative hypothesis (that the current new data batch contains an anomalous cluster of samples, manifesting atypicality with respect to the null model on the same (generally very small) subset of the full feature space). For modeling the alternative hypothesis, embodiments of the present invention include novel parsimonious mixture stochastic data generation mechanisms. Moreover, generalizations of parsimonious mixtures to handle mixed continuous and discrete feature spaces are developed—previous methods handle either continuous-valued features or discrete-valued features, but not both, iii) Use of a model order selection criterion (the Bayesian information criterion (BIC)) to determine whether or not the null hypothesis is violated (i.e., whether there are any anomalous clusters)—For instance, in some previous approaches nonparametric bootstrap significance testing was used to determine whether the null hypothesis is violated. The present invention uses the BIC criterion not only as the learning objective function for both the null and alternative hypotheses, but also as the criterion for hypothesis testing (with the null violated if the alternative hypothesis has a smaller BIC cost than the null hypothesis). Furthermore, significance assessment (bootstrap based or alternative) on the change in BIC score between the null and alternative hypotheses can be used to assess the level of significance of a detected anomalous cluster, iv) Known signatures are not relied upon—The present invention's wholly unsupervised AD unbiasedly and comprehensively measures a rich feature set, and then (in an unsupervised fashion) identifies salient low-dimensional feature subsets, yielding cluster detections with greatest statistical significance—such subsets are chosen consistent with minimization of the BIC objective; thus, a rich set of candidate features are measured and considered, but with only a BIC-minimizing salient (signature) feature subset used to evaluate candidate clusters and to determine whether they violate the null hypothesis.

It is also an object of the present invention to provide a system for and means of actively learning to classify detected anomalous clusters. e.g., to discriminate suspicious from the union of innocuous (mere individual outlier) anomalies and normal samples, as may be relevant e.g. within the context of network intrusion detection; more generally, to classify a cluster of anomalies either to an existing (known) class (but perhaps one not expected to manifest itself in the given context) or as a novel class (perhaps with a suitably chosen identifier (name), giving semantic context to this novel class).

For AD in practice, one often finds too many anomalies are detected. This may be due to limited prior knowledge of the null or normal ("known") outliers. Also, many anomalous samples are due to measurement inaccuracy, equipment glitches, or human error. At the same time, clusters of anomalies, each of which may be weakly atypical individually, will in general be missed by a standard sample-wise AD system. What is generally desired is not to detect all the anomalies, but rather to prioritize the most likely malicious/suspicious (or most interesting) ones (e.g., for behavioral tracking, intrusion detection, email spam), e.g., to discriminate between malicious (interesting) and innocuous (uninteresting) anomalous groups (or, more generally, to classify anomalous groups). A summary feature representation for detected clusters of anomalies from the unsupervised AD system proposed herein can be fed into a (sparingly supervised) active learning system, to determine whether the cluster is suspicious or innocuous (or, more generally, to classify detected clusters). While this can be treated as a supervised learning problem, there are several challenging aspects: 1) there may initially be very few or no known (supervising) examples of what is suspicious/malicious/interesting for a given domain (more generally, these detected anomalous groups may represent novel (zero day) classes—they may not have been seen and named before, or may be known classes but ones that are not expected to be observed in the given domain). Moreover, what is truly suspicious may need to be informed by an expert operator, and could even be subjective (operator-specific). Thus, an active learning (AL) framework, and one that starts in general from scratch (no or very few known suspicious examples), is in general needed. Embodiments of the present invention enable such a framework that can label/classify anomalous clusters of samples, not just individual samples. 2) it is a priori unknown which features may be needed to characterize suspicious classes and to distinguish them from innocuous classes. Moreover, malicious activity will obfuscate its suspicious signature. Thus, if one restricts the features under consideration, one may wholly miss the suspicious signature. On the other hand, many features may be irrelevant (nuisance features). Thus, feature selection is needed. The unsupervised cluster AD invention herein does identify a salient feature subset for each detected anomalous cluster. This can be used to help "narrow down" the feature set of interest. However, the features indicative of "suspiciousness" may still only be a subset of the features indicative of mere joint atypicality. For instance, an exemplary active learning framework may learn to discriminate suspicious from innocuous anomalies (and, more generally, to discriminate between known classes and to discover unknown classes), starts from "scratch" (no labeled examples of suspicious classes), performs implicit feature selection starting from a rich feature set, and builds up the classifier's discrimination ability with sparing, judicious use of human (oracle) labeling. Crucial inductive bias exploited by such a framework is that suspicious activity is a subset of anomalous activity. Consistent with this, an active learning approach may treat p-values as the derived features, which are the inputs to the classifier. Also crucially, the classifier applies non-negative weights to these p-value features, with zero weight indicating an anomalous feature has no association with "suspiciousness". A key innovation in this AL system is the exploitation, in the classifier learning, of the many observed unlabeled samples, which are used to achieve a novel type of semisupervised regularization [Qiu et al., 2017b]. While minimum entropy regularization [Grandvalet and Bengio, 2004] is a standard approach, inspired by the margin maximization principle [Vapnik 1995], whereby the class posterior is chosen so that it maximizes the confidence of its decision making on the unlabeled samples, such an approach fails in semisupervised settings where there are unknown classes and/or rare classes with very few labeled examples [Qiu et al., 2017b]. By contrast. [Qiu et al., 2017b] introduced a fundamental paradigm shift, proposing maximum entropy, rather than minimum entropy, regularization on the unlabeled sample subset. The maximum entropy regularizer keeps the active learning from overfitting on the (potentially precious few) labeled examples and focuses attention (for active labeling) on the samples either most likely to be examples of unknown classes or those which exhibit greatest class (suspicious vs. innocuous) uncertainty. This greatly assists rapid selection of unknown class samples (or samples whose labeling will most benefit discrimination of known versus unknown classes) for (active) labeling—by contrast, minimum entropy regularization confidently classes unknown class samples to existing categories, and hence has great difficulty to identify (for active labeling) unknown class samples or samples with great value for learning to discriminate known versus unknown classes.

In the setting of the present invention, instead of applying active labeling to individual samples, active labeling can be applied to detected clusters of anomalous samples (the cluster whose samples are most likely to belong to an unknown class, or to exhibit greatest class uncertainty, can be prioritized for labeling): i) it may be easier for an operator to label a cogently defined (on a small feature set) cluster, rather than individual samples; ii) in labeling a cluster, the operator is labeling a small batch of samples, which in general will accelerate the learning of a supervised classifier compared with labeling only one sample at a step. Thus, the cluster AD approach can be used to enhance the effectiveness of active learning of a classifier, speeding both discovery of unknown classes and the learning of an accurate classifier. In one embodiment, the AL classifier takes as input summary features from a detected cluster (e.g., the average log p-values of all individual salient features and feature pairs, with these p-values measured with respect to low-order (marginal and pairwise) learned null Gaussian Mixture Models (GMMs)). However, it can be used to classify both clusters as well as individual samples (with an individual sample represented by all marginal and pairwise log p-value derived features).

Novel aspects of the present invention include, but are not limited to:

1. A method that jointly learns and detects anomalous clusters and the (low-dimensional) anomalous patterns that they exhibit. Some prior works make sample-wise detections, rather than group anomaly detections. Samples that are only weakly atypical individually may contribute to strong joint atypicality of a cluster/group. However, some prior works on group anomaly detection require separate procedures for clustering the data and for measuring the degree of anomaly. Moreover, some methods do not learn a salient, low-dimensional anomalous pattern—rather, they use all measured features both in clustering and in assessing atypicality. When many features are noisy/irrelevant, this can compromise the accuracy both of detected anomalous clusters and of their significance assessment. Some sample-wise methods also use all features in assessing the degree of atypicality.

2. The present invention does not require any user setting of thresholds on score values to detect anomalous clusters. Instead, a test to measure statistical significance of any candidate anomalous cluster, compared to normal clusters, is used, based on the BIC cost. In some embodiments, the present invention may still require setting thresholds on p-values for determining statistical significance of candidate anomalous clusters. However, setting thresholds on p-values is a common practice in statistical hypothesis testing, and is much easier and more interpretable (with respect to controlling false positive rates) than setting thresholds on score functions which do not directly relate to statistical significance.

3. The present invention is able to discover anomalous patterns that may lie on a very low-dimensional subspace of a high-dimensional feature space, thus identifying the salient features of the anomalous cluster. This greatly aids interpretability (e.g., by a human operator) of the detected anomalous cluster.

4. The present invention innovatively leverages parsimonious mixture and topic modeling approaches to detect clusters of anomalies on low-dimensional feature subsets of a high-dimensional continuous and or mixed continuous-discrete feature set.

5. In the mixed continuous/discrete valued case, both for learning the null model and alternative models, the present invention combines parsimonious mixture and parsimonious topic models which were respectively separately proposed for purely continuous and purely discrete-valued feature spaces.

6. The present invention also combines detection of anomalous clusters with a semisupervised active learning framework, learning to classify detected anomalous clusters (e.g., either as "suspicious" or "innocuous" or, more generally, to classify them to one of a set of known classes or to an unknown class (which could be a zero-day phenomenon)). The learned classifier can in fact be used to classify sample clusters (as well as individual samples).

DETAILED DESCRIPTION

Figure 1:
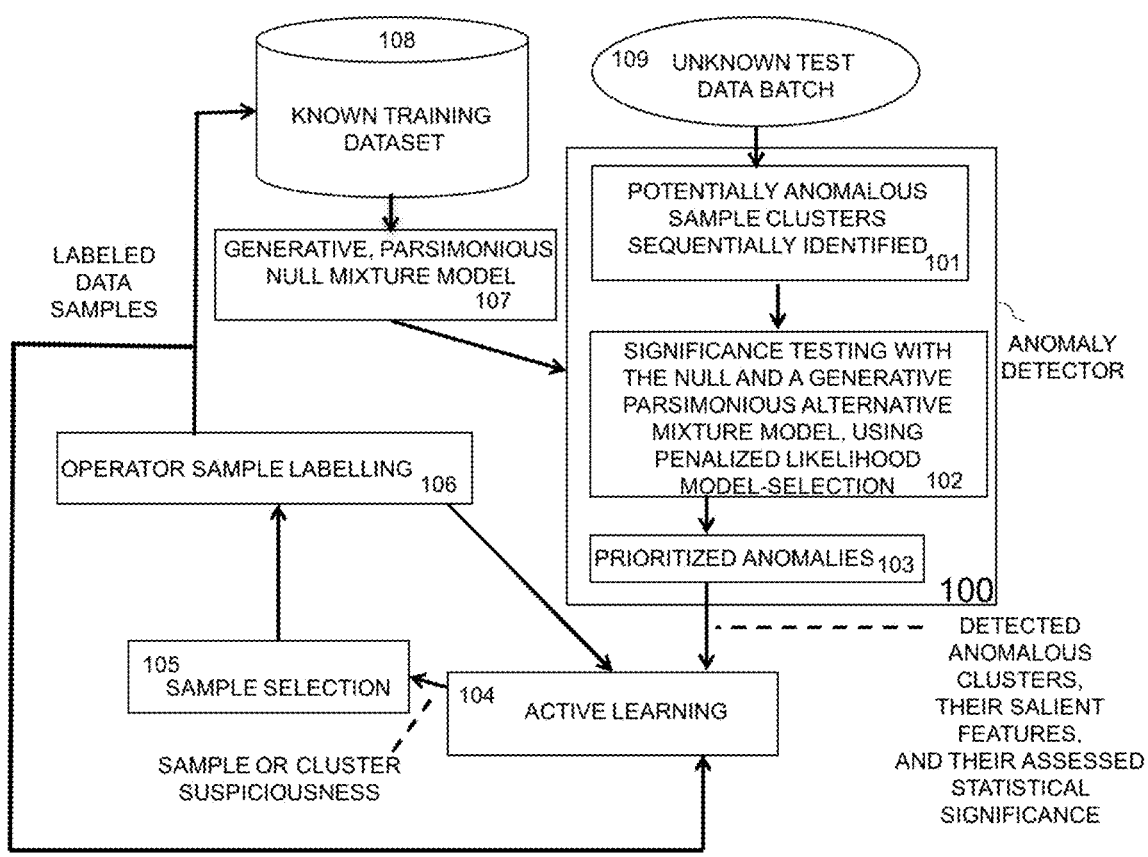
FIG. 1 depicts an embodiment of the present Anomaly Detection and Active Learning invention to detect and adapt to zero-day attacks.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non transitory computer-readable storage medium as described above. When a computer system reads and executes the code and/or data stored on the non transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Overview of Anomaly Detection

The present invention relates generally to the detection of groups/clusters of anomalous samples, with, in general, very high feature dimensionality, that may represent unknown classes (i.e., either classes of phenomena that have not been previously identified or which are known to exist but which are not expected to be observed in a given environment). Moreover, jointly, while detecting these groups/clusters of anomalies, the present invention identifies salient, low-dimensional feature subsets on which the groups manifest their atypicality. That is, in general, many of the measured features may be irrelevant for revealing anomalous groups, but with a group's salient feature subset unknown a priori. Thus, the present invention detects anomalous clusters which are specified jointly by a subset of samples and a subset of features. A method that simply detects individual anomalous samples will not infer that some anomalies have a common statistical character—such inference may be of great practical value. Again suppose that about 100 anomalous flows are detected in a daily batch of about 10,000 network traffic flows. It is very time-consuming for a network administrator to examine each of these anomalous flows. Moreover, unless some are much more statistically significant than the rest, one cannot reliably rank-prioritize detections, so that a human operator can focus attention on a subset that is both manageably small and likely to contain the truly actionable anomalies. This inability to reliably prioritize and, especially, to cogently represent anomalies is one major problem which practically hampers many AD systems. Another is that, if each flow is measured by a high-dimensional feature vector, the anomaly may only manifest on a very small subset of the measured features. Indeed, this is consistent with an attacker trying to minimize their anomalous signature, in order to evade detection. Anomaly detection techniques that assess atypicality of individual samples using all measured features may easily fail to detect an anomalous sample that manifests its atypicality on only a small subset of the measured features. In particular, if one considers the case where the features are statistically independent, then log p-value atypicalities are additive over all features. In this case, the atypicality, which manifests on only a small subset of features, will be averaged out over all features. As the feature dimensionality grows, the assessed degree of atypicality will vanish due to this averaging, and a high rate of missed detection of anomalous samples becomes quite likely. Rather than making 100 individual detections, the present invention's AD can infer e.g., that just 20 of these 100 samples are atypical with respect to the same subset of features, and thus likely originate from a common source. For example, suppose that for each flow there are 1000 features, $X_1, \ldots, X_{1000}$. The present AD may identify that an anomalous cluster of 20 samples is such that all samples in this cluster manifest atypicalities only on the feature subset $\{X_{17}, X_{211}, X_{279}, X_{414}, X_{678}, X_{737}, X_{898}\}$, that is on a seven feature subset of the full thousand-dimensional feature space. A network administrator can feasibly examine a single such cluster of flows, rather than examining many individual flows. Moreover, the detected, low-dimensional anomalous feature subset may give clues to the network administrator about the nature of the anomalous cluster (e.g., whether flow timing features are part of the anomalous feature subset for a detected cluster). Finally, the present AD invention will generally have much better detection performance than sample-wise anomaly detectors, both because it assesses joint atypicality of a collection of samples (it makes group detections), rather than making sample-wise detections, and because it effectively ignores the (in general) many irrelevant features in assessing this joint atypicality.

There may additionally be anomalous samples that are spurious. i.e., outlier data which may not be interesting or actionable in any way. Spurious outliers may not exhibit any anomalous pattern. i.e., each outlier sample may exhibit atypicality on a different subset of the measured features. Here, the focus is on the detection of anomalous groups (clusters) of samples in a given data batch, where the group is defined by the fact that all samples exhibit atypicalities on the same (low-dimensional) feature subset. Such anomalous clusters may be interesting in a scientific setting or actionable in a security setting. Within a security context, such classes may represent "unknown unknowns" or zero-day (never before seen) attacks or intrusions. One such application domain, which is one of the target domains of this patent disclosure, is network-based intrusion detection systems (NIDS) [Sommer and Paxson, 2010]. Prior work on anomaly detection specifically applied in a security setting is next reviewed, focusing for concreteness on network-based intrusion detection. Subsequently, limitations of other general-purpose group anomaly detection techniques will be described.

The current, prevailing frameworks for enterprise NIDS (e.g., Symantec SGS, IBM/ISS SiteProtector, Cisco Adaptive Security Appliance) are: i) "signature-based detection", and ii) "misuse detection", e.g., based on an administrator's working knowledge of what is "correct" use. Signature-based approaches are good at detecting known malicious/attack traffic, and possibly minor variations of known malicious activity, but not unknown attacks. Moreover, the signature-based approach for unknown attacks is passive, e.g., relying on attacks falling into honeynets followed by detailed forensics to create effective signatures. This is a "hit or miss", high-latency approach to NIDS. Furthermore, since network traffic is time-varying and exhibits immense diversity, and yet since there is great imperative to minimize false positives, misuse detection must inherently be highly conservative in some deployment domains, i.e., erring on the side of missing true detections in order to keep the false positive rate extremely low.

Usability/security tradeoffs vary depending on deployment context. In the public commodity Internet, the emphasis is on low false positive detections—thus, many attack signatures with statistically significant detection power are not deployed in, e.g., operational firewalls. However, the priority alternatively tends more toward avoiding missed (true positive) detections over false positives in many corporate private enterprise and government contexts (particularly banking and finance, Intelligence, and Defense, but also networks handling student or health records, where privacy needs to be ensured by law). The confidence in identified anomalies can be improved through automated corroboration with other alerts (again, only rudimentary methods for alert correlation have been deployed commercially), and through costly and slow manual forensics by analysts.

Network traffic is very high-dimensional, semantically unstructured, time-varying, application-evolving, and adversarial. As such, many aspects of network data are inherently largely incomprehensible to a human being, even an experienced network administrator, without the assistance of automated data analysis techniques. i.e., machine learning. Such techniques can be used for data reduction, salient feature selection, clustering to identify common usage patterns and applications, on-line modeling to capture what is currently normal, anomaly detection techniques for quantifying deviations from normal, supervised classification techniques e.g., for inferring the network application of an observed network traffic flow, and, lastly, active learning, in which sparing use is made of human operator feedback/labeling, choosing for labeling the most essential, informative data samples, necessary for adaptively learning an accurate classifier and also evolving the classifier to track an evasive attack (adversary) [Miller et al., 2012b. Qiu et al., 2014, Qiu et al., 2017b, Qiu et al., 2017a].

In several prior works. AD methods are proposed that exploit known characteristics of bots and which aim to detect protocol behavioral anomalies. By exploiting these "known characteristics", these methods in some sense are only good at detecting known attacks, rather than unknown attacks. Moreover, some works calibrate their detectors based on a labeled training set of malware and benign software examples. Thus, these approaches are supervised. Some works narrowly focus on one type of network attack, e.g., detecting P2P botnets, which may only be applicable to distinguishing P2P botnet traffic from legitimate P2P activity.

Detection of anomalous flows using flow-based features continues to receive interest. There are many studies that use network flows to detect botnets, e.g., [Li et al., 2013, Feily et al., 2009], including both supervised and unsupervised methods. Some botnet communications are peer-to-peer based, e.g., [Rahbarinia et al., 2013, Saad et al., 2011], while others are HTTP based, e.g., [Sourcefire]. Some approaches are based on flow-level features, e.g., [Kocak et al., 2014]; others use packet-payload information or interflow features (e.g., inter-flow timing) [Saad et al., 2011, Garcia et al., 2012, Lu et al., 2009, Zeidanloo et al., 2010, Wurzinger et al., 2009]. Approaches relying on payloads have some drawbacks. One is that payload information might be unavailable due to encryption. Also, polymorphic or metamorphic malware may be able to evade payload-information based detection systems.

Flow-based AD work may perform clustering on the unlabeled samples in a captured data batch, and deem some of the less populous clusters to be anomalous, with the fundamental assumption that the vast majority of the samples are "normal", e.g., [Portnoy et al., 2001, Eskin et al., 2002]. The approach of [Portnoy et al., 2001] requires setting of several hyperparameters that are difficult to automatically choose in practice, including the "width" of clusters and the fixed percentage of samples deemed to be "normal". This may lead to a number of limitations. First, all features are used to identify groups of samples (clusters) that are close in feature space, i.e., traditional partitional clustering is performed in feature space, even though many features may be irrelevant. Use of these irrelevant features may confound the clustering's ability to achieve accurate estimation of anomalous clusters. Second, [Portnoy et al., 2001] presupposes anomalous clusters are much less populous than "normal" clusters in the batch and requires user setting of a threshold on the percentage of normal samples. Proper choice of this threshold will not be known in practice and may require lots of trial and error setting.

[Eskin et al., 2002] does not attempt to exploit a null ("normal") training set—it tries to detect anomalies in the captured data batch without reference to a null model. The approaches in [Eskin et al., 2002] attempt to identify, as the anomalies, points that lie in sparse regions of feature space. Flow features such as total duration and total bytes transferred are used in this work. Three methods they propose include a clustering method very similar to [Portnoy et al., 2001], a K-nearest neighbor (KNN) anomaly detection statistic, and a one-class support vector machine. Their KNN-based method identifies as anomalous the flows whose feature vectors have atypically large average distance to their K nearest neighbors. Similar to [Portnoy et al., 2001], this approach makes use of all features in measuring distances between points, which may mask an anomalous signature if anomalies only manifest on a low-dimensional feature subspace.

Similarly, the one-class SVM method, which uses a kernel-based feature mapping and tries to maximize the margin of the vast majority of the mapped points to the origin, also makes use of all features, even though only very few may exhibit an anomalous signature. Another drawback of this method is that there is no procedure given for the selection of the slackness and the kernel hyperparameters for the one-class SVM—detection performance (e.g., the number of detected anomalies) may sensitively depend upon the choice of values for these hyperparameters.

In [Lakhina et al., 2004] network wide anomalies are found by aggregating IP-level traffic data into origin-destination flows, which reduces the scale of the detection problem. The traffic between an origin-destination pair consists of the flows that enter the network at the origin and exit from the destination. The drawback of this approach is that aggregation loses the flow-level resolution of anomalies in the network.

Among previous works, some of them perform sample-wise detections whereas others make cluster-wise detections. But none perform explicit joint statistical significance assessment in detecting clusters.

In [U.S. Pat. No. 8,140,301], a "reverse Bayesian forest", a type of Bayesian network, is used to model the null distribution. This Bayesian network is estimated using a training set of known (ground-truth labelled or "null") samples. For each data sample in a separate (test) batch, an individual anomaly detection decision is made by thresholding the sample's data log-likelihood, evaluated with respect to this Bayesian network model. Moreover, the model allows attributing the detection decision for individual data samples to "root cause" feature dependencies. [U.S. Pat. No. 8,140,301] does not jointly detect clusters of anomalies, where, as defined here, a cluster is a subset of the samples, defined on a subset of the feature set. That is, [U.S. Pat. No. 8,140,301] makes separate individual detection decisions for each sample and uses all the features in making such detections. Thus, [U.S. Pat. No. 8,140,301] does not jointly detect anomalous clusters of samples and it makes use of all features even though many features may be irrelevant/confounding.

Limitations of Other Approaches

Some heuristic approaches aim to detect clusters of anomalies (defined by a feature subset and a sample subset). Unlike approaches which separately learn only a null model and assess approximate p-values based on it, e.g., [Kocak et al., 2014, Qiu et al., 2015], the present invention learns both a null model and an alternative model, and uses statistical significance of the difference between the likelihood fits (or Bayesian scores) under the two hypotheses to detect anomalous clusters. Moreover, instead of separately learning low-order null models on all feature pairs (and thus not positing a true generative model for the feature vector under the null hypothesis), the present invention applies a true generative modeling approach under both the null and the alternative hypotheses, jointly modeling all the measured features, but doing so in a parsimonious fashion so as to mitigate or even eliminate the atypicality masking effect of irrelevant/confounding features.

Moreover, the heuristic approaches [Kocak et al., 2014, Qiu et al., 2015] do not allow evaluating cluster candidates with an arbitrary number of features (ranging from a cluster defined on a single feature all the way up to a cluster defined using even all the features)—these approaches only gave plausible results when the maximum feature subset size of a cluster was severely limited (e.g., up to 5 features). Thus, they artificially limited consideration to candidate clusters with very low feature subset size (maximum of 5 features), with this maximum number in fact a hyperparameter of their method. By contrast, the present invention allows evaluation of cluster candidates with arbitrary number of features, and allows level-playing-field comparison of their score deviations in deciding which cluster to detect (designate as anomalous). Some of the detected clusters may exploit (be based on) many features, while others may use just a few.

In [U.S. Pat. No. 8,503,302], a generic framework is described wherein continuous-valued statistics are extracted from packet flows based on which "dispersions" (e.g., sample variances) are then computed and, in turn, based on which decisions are made as to whether individual flows are anomalous. Unlike the present invention, [U.S. Pat. No. 8,503,302] does not: perform statistical significance testing, consider statistical dependencies among features, or detect clusters of anomalous samples. Moreover, in dealing with packet-flow datasets, [U.S. Pat. No. 8,503,302] averages numerical measurements (e.g., packet sizes) over a temporal window (in order to compute statistics such as the mean and variance over the window), whereas the approach of the present invention treats each individual packet size as a feature in evaluating a candidate cluster's joint statistical significance score; i.e., the present invention is able to handle, with fidelity, a high-dimensional space of non-aggregated/non-derived features.

Though the present invention's known (ground truth labelled) dataset on which the null modeling is based may involve traffic handled by different network devices in one preferred embodiment of the present invention, in [U.S. Pat. No. 8,474,041] they use principal components on sketches/statistics from different network devices for feature selection. Unlike the present invention, their method involves hyperparameters that need to be configured by an administrator.

The limitations of existing statistical AD frameworks are now summarized in general. Standard statistical AD methods may involve applying:

1. a single statistical (e.g., p-value) test, based on the joint density function defined on the fill (high) D-dimensional feature space;
2. multiple tests, e.g., tests on all single features and e.g., all pairwise feature densities, with the (highest priority) detected anomaly the sample yielding the smallest p-value "aggregate" (e.g., arithmetic averaging, geometric averaging, or finding the minimum of the p-values over all the tests [U.S. Pat. No. 9,038,172. Miller et al., 2012a]);
3. an outlier discrimination strategy as embodied e.g., by the one-class support vector machine [Shin et al., 2005]: or
4. traditional (e.g., partitional) clustering [Duda et al., 2001] to detect anomalous clusters of samples [Nguyen and Armitage, 2008, Casas et al., 2012. Portnoy et al., 2001, Eskin et al., 2002].

A limitation common to Methods 1-3 is that they perform sample-wise detections and thus, as discussed earlier, will neither detect anomalous clusters nor recognize that two detected samples belong to a common (anomalous) cluster. Beyond this, all of the above methods, because they detect using all the features, have disadvantages when anomalous clusters manifest on a low-dimensional subset of the D features, with many of the features irrelevant/confounding.

Specifically, for Method 1: Estimation of the joint density function may be quite inaccurate (curse of dimensionality)—the present invention addresses this problem by using parsimonious modeling of the full feature vector [Graham et al., 2006], [Markley et al., 2010]. [Soleimani et al., 2015]. For Method 2: Use of many features (tests) within a sample-wise detection strategy may increase the number of false positives; moreover, this approach does not detect anomalous clusters. For Method 3: One limitation is the need to choose hyperparameters of the SVM's kernel—notably, within an AD setting, there is no supervising guidance for such choices. The proper setting of hyperparameter values is in fact a general problem for many existing AD methods, some of which require setting several or even many such parameters. Notably, the AD of the present invention does not require any hyperparameters except for the detection significance threshold, which is needed to specify the tradeoff between false positives and missed detections. Second, the contribution to the SVM's discriminant from the truly atypical features may be confounded amongst the much larger set of noisy/irrelevant features. Nonlinear kernels implicitly define generalized coordinates that include product features (and, thus, will "mix" salient and irrelevant features through their products). In this way, the contribution to the discriminant from salient features may be distorted by use of the kernel. For Method 4: This is often applied in practice. However, clustering generally uses all features and thus the estimated clusters will be biased by the many noisy/irrelevant features. Moreover, the number of clusters is a hyperparameter of this method, which is very difficult to choose, especially for very high-dimensional feature spaces, where there is gross failure of model order selection techniques when applied in conjunction with traditional partitional clustering techniques [Graham et al., 2006]. The present invention solves this problem by using the parsimonious modelling framework, which is shown in [Graham et al., 2006], [Markley et al., 2010], and [Soleimani et al., 2015] to give both quite plausible model order estimates consistent with the ground-truth number of defined classes present in the dataset, as well as order estimates that empirically are seen to achieve excellent generalization performance (close to the best test set data likelihood, over all model orders).

While detecting clusters is operationally more valuable than sample-wise detections, if such clusters are present, detection strategies that explicitly search for them should also be superior to traditional sample-wise detection methods even purely from a detection-theoretic standpoint. i.e., in terms of the detection power/false positives tradeoff—detected clusters may achieve greater joint statistical significance than the sample-wise significance of the individual samples which comprise them. The present invention makes such joint (cluster) detections, and does so consistent with minimization of a theoretically grounded model-selection objective—the Bayesian Information Criterion (BIC) [Schwarz, 1978].

Next, previous (related) general-purpose approaches for group (cluster) anomaly detection are reviewed. The problem of detecting clusters of data points which exhibit similar anomalous patterns is sometimes referred to as group anomaly detection [Xiong et al., 2011a], [Yu et al., 2014], [Muandet and Scholkopf, 2013]. Detecting clusters of anomalies and group anomaly detection will be referred to synonymously. Unlike these previous works, the focus here is on group anomaly detection in very high-dimensional data domains, where the samples in a group are expected to manifest their anomalies on a (common) low-dimensional (a priori unknown) subset of the high-dimensional feature set. Thus, the present invention requires jointly detecting these clusters of samples and their (in general, low-dimensional) salient feature subsets.

[Xiong et al., 2011a] proposes a Mixture of Gaussian Mixture Models (MGMM) for group anomaly detection. [Xiong et al., 2011a] assumes each data point belongs to one group and that all points in a group are modeled by the group's Gaussian mixture model. Mixing proportions of the mixture model for each group, however, are not freely estimated, but rather, in a hierarchical way, are selected from a limited set of T possible mixing proportion "types" (genres). These types represent the normal behaviors. A test group is called anomalous if it has low likelihood under the normal types. This idea is then extended to Flexible Genre Models (FGM) in [Xiong et al., 2011b] by treating mixing proportions as random variables which are conditioned on possible normal genres. One significant shortcoming of these methods is that they assume that the group membership for every data point is known a priori. Since this information is not available in general, one must in practice perform hard clustering of the data into groups prior to applying FGM or MGMM. Such clustering, working in the full (high-dimensional) feature space, may be highly inaccurate when the anomalous pattern lies on a low-dimensional feature subspace. Another major issue with these methods is that they do not provide any statistical significance test for group anomalies—they simply declare a candidate cluster anomalous if it is among the top K % of clusters with highest anomaly scores or if its anomaly score is higher than a pre-set threshold value. Note that the proper choice of such thresholds is problem-dependent—a poorly chosen threshold may lead either to a high false detection rate or to weak detection power.

[Yu et al., 2014] addresses the first issue by presenting a method, specifically for network analysis, for jointly detecting groups of similar nodes and computing anomaly scores for the discovered groups. Nevertheless, unlike the present invention, [Yu et al., 2014] does not provide a technique for discovering "hard" anomalous clusters one by one—some post-processing effort is required to hard-assign each data point to the cluster with highest membership degree. Moreover, [Yu et al., 2014] does not provide any statistical significance testing and relics on choosing an appropriate threshold for detecting anomalous clusters.

[Muandet and Schölkopf, 2013] follows a discriminative approach to group anomaly detection and generalizes the idea of one-class support vector machines to a space of probability measures, proposing one-class support measure machines. Groups in this method are represented as probability distributions which are mapped into a reproducing kernel Hilbert space using kernel methods. Similar to MGMM, this method requires hard-clustering of the data prior to detecting any anomalous group.

[Wong, 2002] proposes rule-based anomalous pattern discovery for detecting disease outbreaks. Anomalous patterns in this method are characterized by first or second order "rules". Each rule is simply a set of possible values that a subset of categorical features take on. Significance of each rule is measured by comparing occurrence frequency of each rule in the test set relative to the training set by conducting Fisher's exact test and a randomization test. This idea is then extended in [Wong et al., 2003], which uses Bayesian networks to measure relative significance of each rule. [Das et al., 2008] uses a similar procedure, but first detects individual anomalous points and then searches for possible patterns among them. These methods do provide statistical testing procedures to measure significance of each cluster. They can also (for very low dimensional problems) detect salient features for each cluster. But, unlike the present invention, they do not provide a technique for jointly detecting clusters and their associated low-dimensional anomalous patterns. This, in particular, makes these methods less suitable for high dimensional domains (such as packet flows, images and text documents).

[McFowland et al., 2013] proposes Fast Generalized Subset Scan (FGSS) to detect anomalous patterns in categorical datasets. Unlike other approaches. FGSS constructs anomalous clusters by jointly searching over subsets of data instances and subsets of anomalous attributes. FGSS has better scaling characteristics than [Das et al., 2008] and [Wong et al., 2003] and, thus, can detect anomalous patterns which lie on subsets of higher dimensional feature spaces. However. FGSS requires computing a p-value for each feature of every sample based on a Bayesian network learned on the training set. Learning Bayesian networks may not be practically feasible for high-dimensional problems such as text documents where there may be tens of thousands of features. Moreover, FGSS can only detect a subset of anomalous features for each cluster—unlike the present invention, FGSS does not provide a statistical model (an alternative model) for the common pattern of anomalies exhibited by the cluster.

[Soleimani et al., 2016] develops an approach for detecting clusters of anomalies solely for discrete data, such as text documents. The invention developed here applies to discrete feature spaces, to purely continuous-valued feature spaces, and to mixed continuous-discrete valued feature spaces (encompassing for example image data with an accompanying document/comments/captions). Also unlike [Soleimani et al., 2016], the present invention applies the same objective function (a penalized likelihood function such as BIC) both for learning the null and alternative models and for measuring the deviation between the null and alternative hypotheses, for candidate anomalous clusters. That is, the learning criterion (e.g., BIC) is also used in our approach as the basis for hypothesis testing, unlike [Soleimani et al., 2016], which requires setting of hyperparameters to fully specify the detection approach. Thus, our approach is less heuristic and ad hoc than the approach in [Soleimani et al., 2016], and by using the same criterion (e.g., BIC) for learning and hypothesis testing, does not require setting of hyperparameters.

MORE DETAILED DESCRIPTION OF DRAWINGS

FIG. 1 depicts an embodiment of the present Anomaly Detection and Active Learning invention, to detect and adapt e.g. to zero-day attacks. 100 is the anomaly detector identifying and prioritizing (103) anomalous clusters (101) of a received unknown data-batch (109) using a null (107) based on a repository of known samples (108), and employing statistical significance tests (102) to assess the joint significance of each detected cluster. A classifier learned via semisupervised active learning (104) assesses a level of suspiciousness (or more generally, a known class/unknown class association) for clusters or individual samples, which allows for selection (105) to facilitate cluster (or sample) labeling by an operator (106), which is also fed back to inform Active Learning so that the classifier can be adapted to account for this newly labelled information.

Figure 2A:
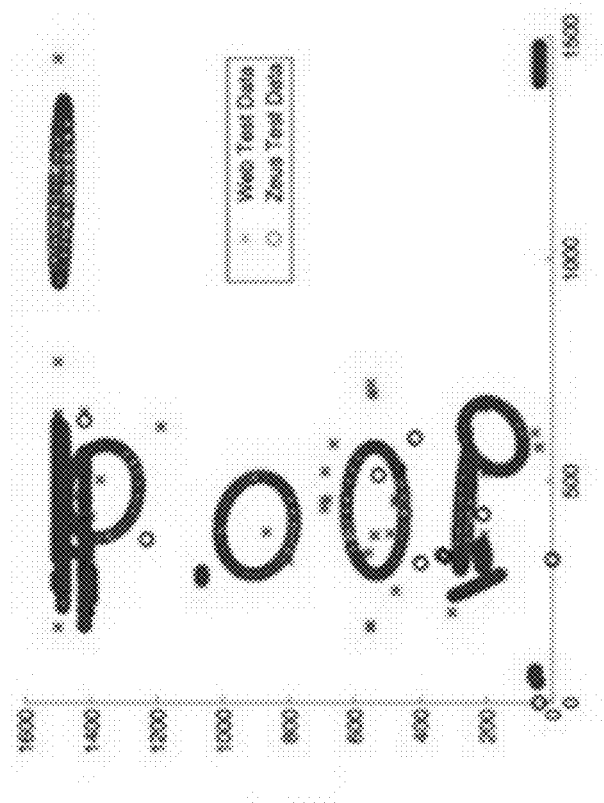
FIG. 2A and FIG. 2B depict example data and an associated behavioral model for two continuous feature dimensions, here captured by a Gaussian mixture model of known Web traffic (packet-flow) data, with exemplary points of Zeus botnet command-and-control traffic (in the role of zero-day malicious traffic) also shown.
Figure 2B:
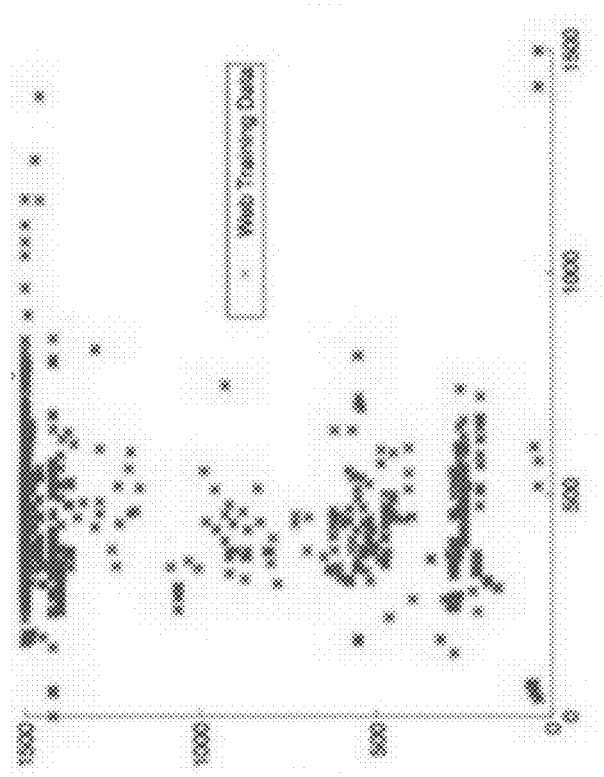

FIG. 2 depicts an example known ("null") behavioral model for two continuous feature dimensions from a packet-trace of Web activity. On the left, the raw samples are depicted. Note that these null samples spatially cluster (in these two dimensions) and thus are well modeled by two-dimensional Gaussian component densities. On the right, the Gaussian mixture model (known, null) components are depicted (ovals). Additionally, samples from Zeus botnet command-and-control packet traces [Sourcefire] are depicted. Experimentally, the Zeus samples together with some "held out" innocuous Web samples may be used to form an unlabeled data batch (note the LBNL Web data predates widespread Zeus-botnet command-and-control activity). In the context of the null informed by the remaining (great majority) of Web samples, note how for these two features, some of the Zeus samples are within the ovals, i.e., would be deemed "known" according to these two features, while others are outliers; moreover, note the presence of "known" outliers.

Figure 3:
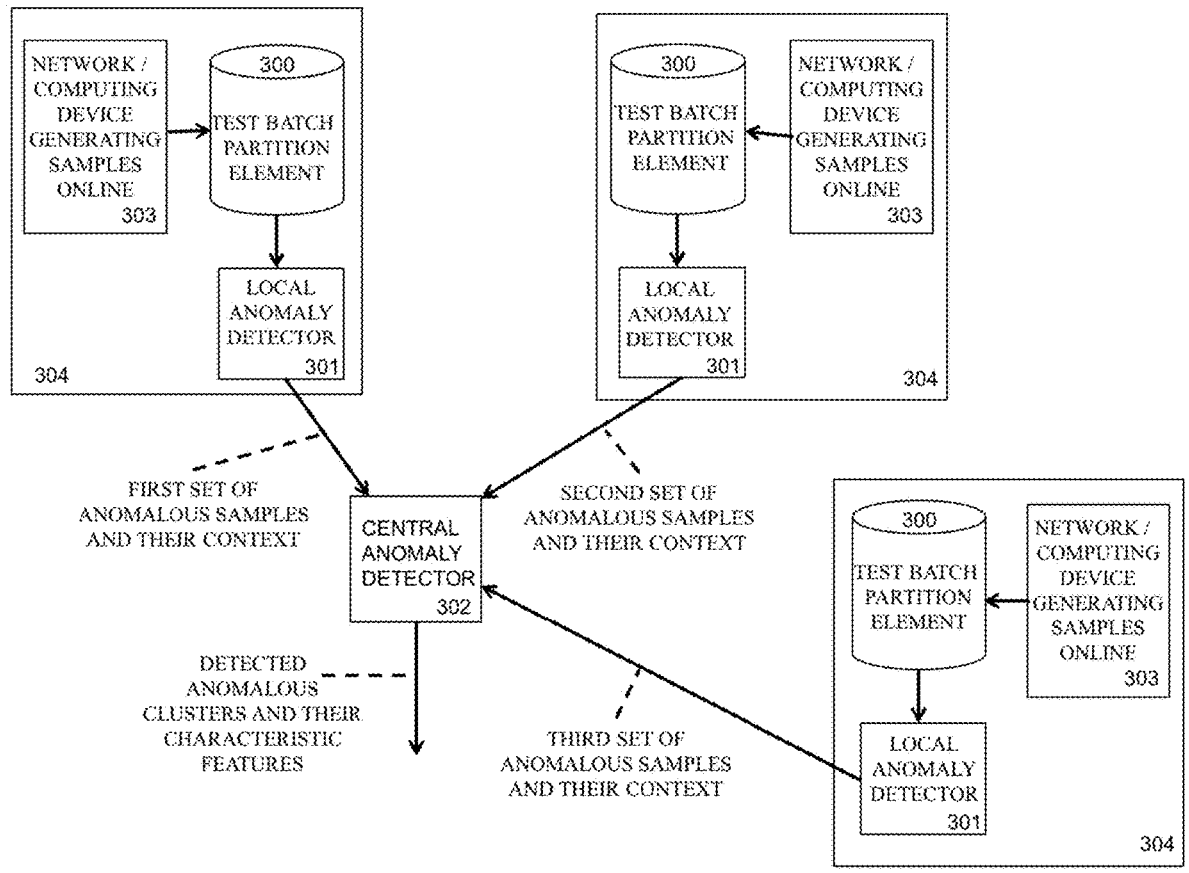
FIG. 3 depicts an embodiment of a distributed implementation of the present invention with a central anomaly detector operating with plural remote anomaly detectors in a hierarchical fashion.

FIG. 3 depicts an embodiment of a distributed implementation of the present invention. A central anomaly detector (302) receives outlier samples, and associated contextual information, from plural local anomaly detectors (301) each located in a different station (304), each with their own portion of the unknown data-batch (partition element of the total test set, 300) generated by the station's monitored network or computing device(s) (303). The local anomaly detectors (301) may operate according to the present invention or by some other means. The central anomaly detector (302) operates according to the present invention on the union of outlier samples identified by the local anomaly detectors to identify the anomalous clusters with high statistical significance.

Figure 4:
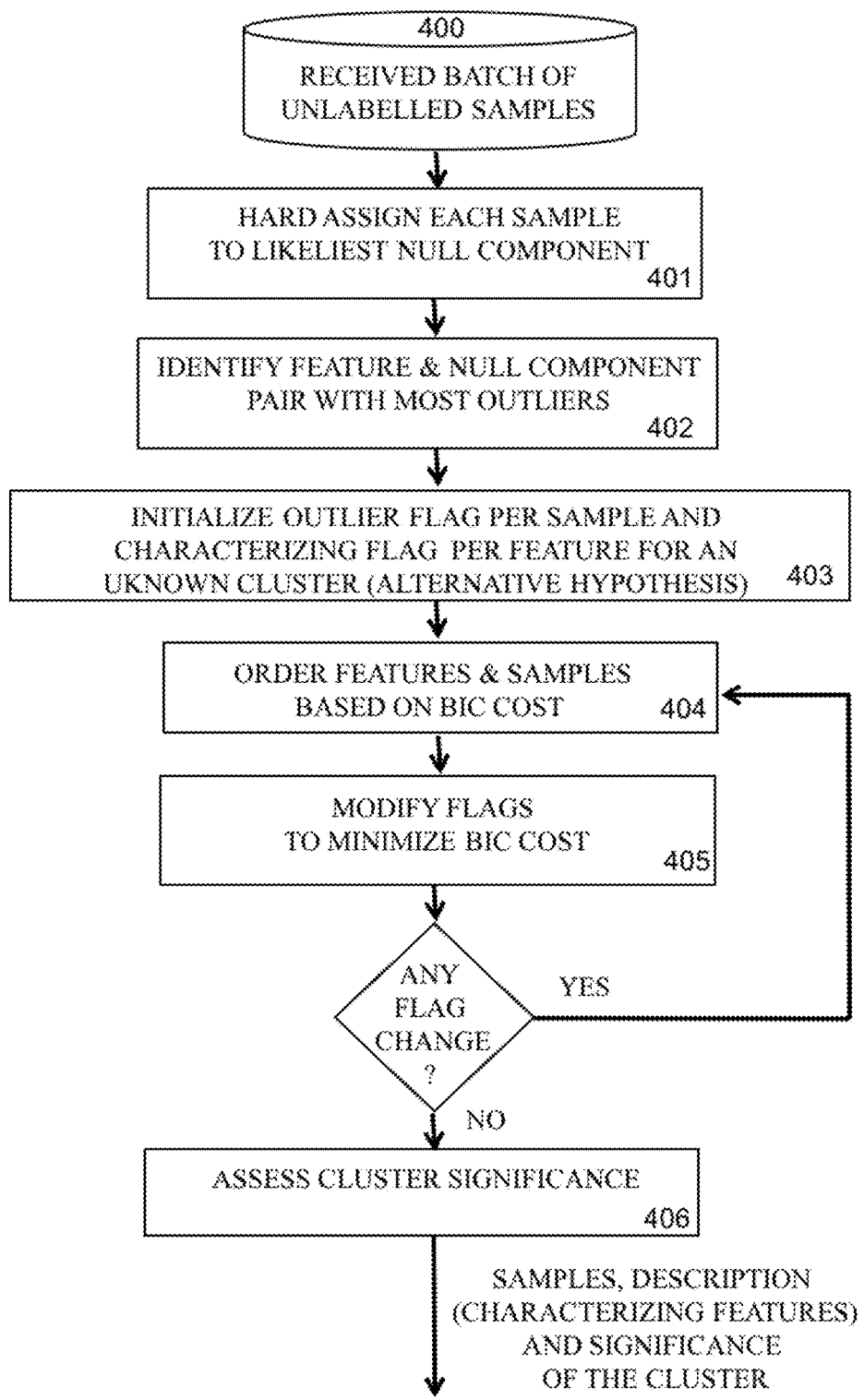
FIG. 4 depicts an embodiment of the present AD invention given a parsimonious null.

FIG. 4 depicts an embodiment of the present anomaly detector invention given a parsimonious null. Unlabelled samples from a test set (400) are hard assigned to their likeliest null components (401). The (feature, null component) pair with the most outliers is identified (402). Each sample and feature is assigned a flag indicating membership or otherwise in a parsimonious alternative model to the null that includes a cluster representing unknown behaviors or categories (403). Until there is no change in these switches, the features and samples are ordered based on BIC cost (404) and their flags are updated to minimize BIC cost (405). Finally, the cluster significance is assessed and a description and significance of the cluster is output.

Figure 7:
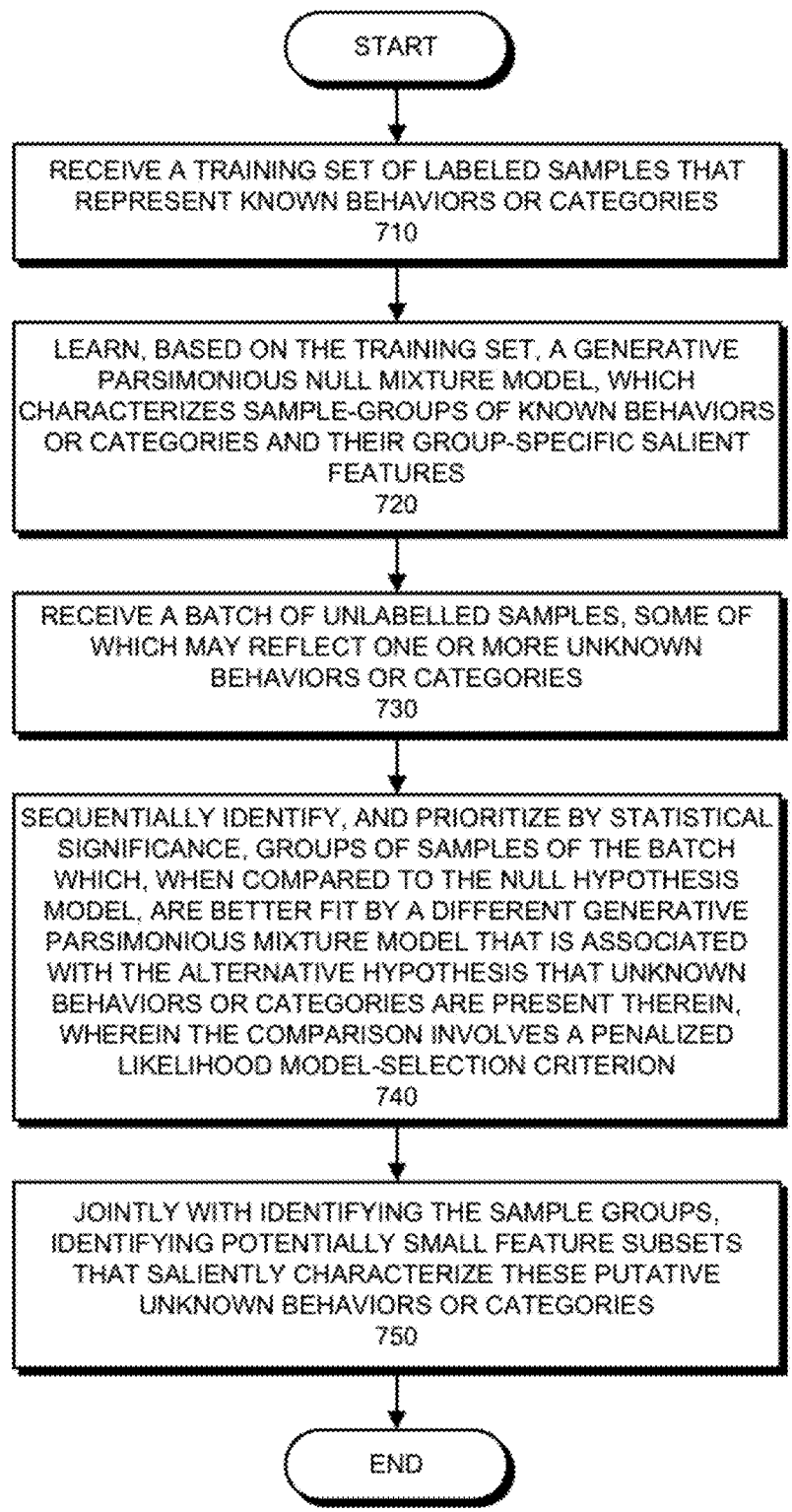
FIG. 7 presents a flow chart that illustrates the process of performing anomaly detection on batches of data samples with potentially huge feature dimensionality in accordance with an embodiment.

FIG. 7 presents a flow chart that illustrates the process of performing anomaly detection on batches of data samples with potentially huge feature dimensionality. During operation, an anomaly detection device receives a training set of labeled samples that represent known behaviors or categories (operation 710). This training set is analyzed to learn, based on the training set, a generative parsimonious null mixture model that characterizes sample-groups of known behaviors or categories and their group-specific salient features (operation 720). Next, a batch of unlabelled samples are received; some of the samples in this batch may reflect one or more unknown behaviors or categories (operation 730). Groups of samples from this batch are sequentially identified and prioritized by statistical significance and determined to, when compared to the null hypothesis model, better fit to a generative parsimonious mixture model that is associated with the alternative hypothesis that unknown behaviors or categories are present (operation 740). This comparison involves a penalized likelihood model-selection criterion (model cost that is a penalized likelihood). Jointly with identifying these sample groups, another aspect involves identifying potentially small feature subsets that saliently characterize these putative unknown behaviors or categories (operation 750).

For an embodiment of the present invention's Anomaly Detector by unsupervised learning, unbiased feature extraction is first described, for the case of network intrusion detection. For example, consider a data batch consisting exclusively of "port 80" packet flows/sessions (ostensibly all Web application), albeit in fact with some Zeus bot command and control flows present (Zeus plays the role of an example of an unknown, never before seen, or "zero-day" attack activity). Suppose each flow's feature vector is based on the first K packets in the bidirectional packet flow. We assume, as a reference, that packets in the flow are alternating client-to-server and server-to-client. Thus, for any given flow, if there are two consecutive packets in the same direction, we insert a zero between them, signifying a lack of a packet in the alternating direction. In principle, packet size and other packet header information, packet timing, packet direction sequence, as well as payload information could be used to represent each packet. When such information is available, the present invention will exploit it. In some experimental settings, attacks are often captured from a different network domain, with different timing characteristics than then normal/null flows; also payload information is often unavailable; thus, without limiting the scope of applicability suppose as an example where only the packet size and direction information is considered. Accordingly, in one experimental example, each flow is modelled by a mixed continuous/discrete feature space consisting of the sequence of packet sizes (for those packets with non-zero size) and the (binary) sequence of packet directions.

Suppose that consecutive batches of such flows are continually gathered (each representing e.g., one hour of observed activity). The present invention would aim to identify the bot flows, collectively, as an anomalous group (cluster) in a batch (or possibly, as multiple anomalous subgroups), classify these clusters via the active-learning based classifier, and issue associated alerts through the network intrusion detection system (NIDS). By prioritizing clusters of anomalies, the NIDS is offered an opportunity to feasibly fuse alerts based on different datasets (e.g., network protocols, intra-host activity), or may possibly even allow the security administrator to manually inspect the most anomalous clusters, to confirm a cyber attack and make an immediate response.

Principled Approach for Prioritized Cluster-Anomaly Detection

A framework for anomaly detection (AD) typically begins by identification of a standard feature space on which a null model can be learned and on which all captured unlabeled samples (feature vectors) can be assessed for atypicality referenced to the null. The feature space should necessarily be comprehensive as it is not in general known a priori which features are needed in order for a subset of unlabeled test batch samples representing an (unknown) attack (or unknown class) to be detectable as a significant outlier cluster with respect to the known (null) model (which is learned based on a ground-truth labeled/known data-set). The individual features may be continuous, binary, more general categorical, or ordinal.

Mixed Continuous/Discrete Feature Space Null Model

To model the feature space under the null, parsimonious mixture models were proposed to handle either continuous-valued or discrete-valued feature spaces, are herein generalized so as to model both continuous-valued and discrete-valued features. As one example, for modeling an (image, text document) pair, one would extract a fixed-dimensional continuous-valued feature vector from the image (e.g., using deep neural network feature extraction) and e.g. using a "bag-of-words" representation for textual features (word counts, for each word in a given dictionary of fixed size, ignoring word ordering in the data sample). One can then learn a null mixture model where, for example: 1) the continuous-valued and discrete-valued features are assumed conditionally independent, given a selected component; 2) individual mixture components represent the continuous-valued feature subvector using a parsimonious GMM, either of naive Bayes form [Graham et al., 2006] or a more general form [Markley et al., 2010].

Parsimonious modeling of both the continuous and discrete-valued features is chosen for a number of reasons. First, parsimonious models typically achieve better generalization accuracy than full, unconstrained models (e.g., unconstrained Gaussian mixture models and latent Dirichlet allocation (LDA)) and they automatically estimate the number of mixture components. They also produce quite plausible, accurate estimates of the number of components, even for very high-dimensional feature spaces, with thousands of features. By contrast, unconstrained models suffer gross failure of model order selection in high feature dimensions, i.e., the BIC-"optimal" unconstrained (non-parsimonious) model may have a single mixture component, only because the BIC penalty associated with a model with more components, which grows at least linearly with the feature dimension and the number of components, is so severe, and does not justify additional components unless the number of training samples is large, relative to the feature dimensionality. Moreover, for the example of a bag-of-words representation of features for datasets with textual elements, methods such as LDA in fact do not automatically determine the model order—they require the number of topics to be set by a user [Blei et al., 2003]. Note that model order selection is a crucial step in anomalous cluster discovery. Specifically, since significance of any anomalous cluster will be measured with respect to the null model (normal components), either under or overfitting the null can lead to either false discovery or missed detection of anomalous clusters due, respectively, to limited modeling power (model bias) or to overfitting. Moreover, parsimonious modeling techniques identify a highly sparse set of component-specific salient (informative) features for each component. This makes parsimonious models a natural fit for the cluster-of-anomalies detection technique elaborated here—for the scenarios and application domains considered herein, anomalous clusters may manifest on a very low-dimensional subset of the full feature set (since BIC will be used as the criterion for determining novel (anomalous) clusters, this assumption is expected to be borne out, as the number of samples in an anomalous cluster is expected to be relatively small, which thus "supports" (so as to minimize BIC) only relatively few informative features (with associated parameters that specify the anomalous cluster)). Parsimonious models are thus expected to have an inherent performance advantage over non-sparse models, which use all the features (and many parameters) in defining anomalous clusters. For example, the use of parsimonious topic models both to represent the null and to model the alternative hypothesis model can achieve much better results than when the non-sparse LDA model is instead used for anomalous topic discovery in document databases [Soleimani et al., 2016]. A similar advantage is found for purely continuous and mixed continuous/discrete feature spaces, through the use and extension of parsimonious modeling.

The learning objective is the BIC cost function, which is minimized via a model order (number of components) reduction procedure wherein, at each model order, BIC is minimized via a generalized EM (GEM). GEM updates, rather than EM updates, are needed to optimize the binary switch variables, which determine the parsimonious structure of the model, as well as sparse off-diagonal covariates, if these are allowed as in [Markley et al., 2010]. At each order reduction step, one can either discard the component with least probability mass (or use some other criterion) or use trial-deletion, with the permanently deleted component the one that results in the least BIC cost.

As one embodiment, consider the case of a continuous/discrete (binary-valued) parsimonious mixture model where, under a component-generation hypothesis, the continuous feature subvector is modeled by a parsimonious naive Bayes multivariate Gaussian model and the discrete-valued subvector of the sample is modeled by a parsimonious Bernoulli model (alternatively, e.g., for datasets with textual features, a bag-of-words discrete feature subvector could either be modeled by a multinomial distribution [Graham et al., 2006] or via topic models [Soleimani et al., 2015]). In this case, one embodiment of the BIC cost function, to be minimized in learning the null model, is:

$$BIC(\Theta(M), X_{train}) = CC(M, \{v_{jk}^c\}) + CC(M, \{v_{jk}^d\}) - \sum_{i=1}^{N} \log\left[\sum_{j=1}^{M} \alpha_j \left(\prod_{k=1}^{D_C} P[x_{ik}^c | \theta_j]^{v_{jk}^c} P[x_{ik}^c | \theta_s]^{(1-v_{jk}^c)}\right)\right] \quad (1)$$

$$\left[\left(\prod_{k=1}^{D_d} p_{jk}^{v_{jk}^d x_{ik}^d} p_{sk}^{(1-v_{jk}^d)x_{ik}^d}\right)\right].$$

Here, $D_c$ and $D_d$ are the number of continuous and discrete-valued features, respectively, $N=|X_{train}|$ is the number of training data samples, M is the number of mixture components, $x_{ik}^c$ and $x_{ik}^d$ are the k-th continuous and discrete features, respectively, for the i-th data sample, $v_{jk}^c$ and $v_{jk}^d$ are binary indicator variables for whether or not the k-th continuous and discrete features, respectively, are topic-specific for the j-th component. $P[x_k^c|\theta j]$ is the component-specific Gaussian density for the k-th continuous feature for component j. $P[x_k^c|\theta_s]$ is the shared Gaussian distribution for feature k, θ are the parameters (means, variances) of these distributions, $p_{jk}$ is the component-specific Bernoulli parameter for the k-th discrete feature under component j, $p_{sk}$ is the shared Bernoulli parameter for the k-th discrete feature. $\alpha_j$ is the mass (prior probability) for a sample to be generated by component j, and the logarithms (log) are base 2. Moreover, in one embodiment the BIC Complexity Cost (CC) term (defined separately for continuous and discrete-valued features) is:

$$CC(M, \{v_{jk}\}) = \qquad (2)$$

$$\frac{M-1}{2}\log N + D\log 3 + \sum_{k=1}^{D}\left[F_1(v_k)\frac{Q}{2}\log N + F_2(v_k)\frac{QM}{2}\log N + F_3(v_k)\left(\frac{Q}{2}\log N + \sum_{j=1}^{M} v_{jk}\frac{Q}{2}\log N + M\log 2\right)\right],$$

where:

$$F_1(v_k) = \begin{cases} 1 & \text{if } \sum_{j=1}^{M} v_{jk} = 0 \\ 0 & \text{otherwise} \end{cases} \quad F_2(v_k) = \begin{cases} 1 & \text{if } \sum_{j=1}^{M} v_{jk} = M \\ 0 & \text{otherwise} \end{cases}$$

$$F_3(v_k) = \begin{cases} 1 & \text{if } 0 < \sum_{j=1}^{M} v_{jk} < M \\ 0 & \text{otherwise} \end{cases}$$

Here, Q is the number of parameters needed to specify a feature's distribution (which may be different for continuous and discrete-valued features). Also, the D log 3 term is the (fixed) cost of specifying, for each feature, whether i) all components use specific representations; ii) all components use shared representations; iii) some use shared and some use specific representations.

Note that the number of real-valued parameters to specify and the number of binary switch variables to specify are quite different under these three cases (as examples: under the all shared case, only the shared parameters need to be specified (penalized for) and no binary switch variables need to be specified, i.e., in this case, the model penalty term associated with this particular feature is quite small, whereas under the all-specific case, all real-valued parameters—except for the shared parameters—need to be specified, but again no binary switch variables need to be specified). Note that an example alternative choice of BIC penalty function, based on different choices for prior distributions on the binary switch variables, has been applied specifically to topic models. For the example of data samples with textual features, if the discrete feature subvector is a bag-of-words subvector, rather than a binary subvector, then this BIC cost function remains the same as above, except that now $x_{ik}^d$ is a count of the number of times word k occurred in document i, $p_{jk}$ and $p_{sk}$ are now multinomial parameters, rather than Bernoulli parameters, and the model parameters must satisfy the multinomial probability mass function constraint for each mixture component:

$$\sum_{k=1}^{D_d}[v_{jk}p_{jk} + (1-v_{jk})p_{sk}] = 1, \text{ for all } j = 1, \ldots, M.$$

The model parameters, consisting of the Gaussian parameters for each continuous-valued feature, the Bernoulli parameters for each discrete feature, the component masses, the shared parameters, the binary switch variables, and the number of components. M, are all chosen consistent with minimization of the BIC cost function defined above.

Null Model Learning

In one embodiment of the present invention, learning for our above-defined mixture (or one of its variants) consists of the model-order reduction procedure, with minimization of the BIC cost performed for a sequence of decreasing M, starting from an initial (large) number of components, $M_{max}$. For some model variants of interest, the minimization is performed via a generalized expectation-maximization (GEM). GEM, rather than pure EM, is needed when there is "coupling" between parameters that prohibits a joint optimization of all parameters in one global maximization (M)-step. Alternatively, in GEM, global optimizations are successively performed on well-chosen variable subsets which can be tractably, globally optimized, given all other parameters held fixed. Specific to the Gaussian-Bernoulli model embodiment described above, a single iteration of the model-order learning embodiment (following a parameter initialization) consists of: 1.) E-step, which computes the a posteriori probability of each training sample $\underline{x}_i$ being generated by each mixture component (M=j):

$$P[M=j|\underline{x}_i] = \frac{\alpha_j\left(\prod_{k=1}^{D_c} P[x_{ik}^c|\theta_j]^{v_{jk}^c} P[x_{ik}^c|\theta_s]^{(1-v_{jk}^c)}\right)\left(\prod_{k=1}^{D_d} p_{jk}^{x_{ik}^d v_{jk}^d} p_{sk}^{x_{ik}^d(1-v_{jk}^d)}\right)}{\sum_{m=1}^{} \alpha_m\left(\prod_{k=1}^{D_c} P[x_{ik}^c|\theta_m]^{v_{mk}^c} P[x_{ik}^c|\theta_s]^{(1-v_{mk}^c)}\right)\left(\prod_{k=1}^{D_d} p_{mk}^{x_{ik}^d v_{mk}^d} p_{sk}^{x_{ik}^d(1-v_{mk}^d)}\right)}, \qquad (3)$$

i.e., it is the expected value of $A_j$, where $A_j$ is a binary indicator random variable that is 1 if $\underline{x}_i$ is generated by component j, and zero otherwise; 2.) Generalized M-step, with i) update of component weights $\{\alpha_j\}$, the Gaussian mean and variance parameters $\{\theta_j\}$, the component-specific Bernoulli parameters, and the shared Gaussian $\{\theta_s\}$ and shared Bernoulli parameters, given fixed $\{v_{jk}^c\}$ and $\{v_{jk}^d\}$, and ii) determination of the optimal $\{v_{jk}^c\}$ and the optimal $\{v_{jk}^d\}$ configurations, whose determinations can follow a computationally efficient strategy based on the consideration of the three cases (all components topic-specific, all shared, or somewhere in-between); 3) Optimization of the shared Gaussian and Bernoulli parameters [Graham et al., 2006]. These steps are non-increasing in the BIC cost function, and thus guaranteed to find a local optimum. Convergence of the learning can thus be based on the (nonnegative) difference between the BIC costs before and after each iteration. Learning proceeds until this difference drops below a predetermined threshold or a maximum number of iterations is reached. Related, albeit somewhat more complicated GEM can be used to learn the model parameters in the Gaussian-multinomial model and Gaussian-topic model cases. Moreover, off-main-diagonal covariates for the Gaussian components can be sparingly introduced, again consistent with minimizing BIC, via the GEM strategy [Markley et al., 2010].

Parameter Initialization for Null Learning

Starting estimates for the $\{\theta_j\}$ are determined using K-means clustering with $K=M_{max}$ initial centers randomly chosen from the database. For the case of Gaussian-Bernoulli or Gaussian-Multinomial mixtures, the $M_{max}$ Gaussian means are estimated as the centroids of the clusters (with the component variances then estimated using sample variance estimation based on the estimated means). Similarly, the discrete-valued features' parameters are estimated via frequency counts, based on the samples hard-assigned to the associated clusters. K-means clustering can, e.g., either use squared Euclidean distance for all features, or the negative of the complete data log-likelihood for all features (where the hidden data are the hard 0-1 data-point assignments to clusters). Similar initialization can be employed in the case of Gaussian-topic models. Component masses can be uniformly initialized using $$\alpha_j = \frac{1}{M_{max}}$$

for all j. The $\{v_{jk}\}$ switches are initially set to 1 for all j, k, for both continuous and discrete-value features—this is in some sense least biased, as it is difficult to know a priori which features are uninformative for a particular component. The shared distribution parameters are initially estimated globally, i.e., based on the entire database. For the Bernoulli (or multinomial) case, this means that the maximum likelihood estimate $$p_{sk} = \sum_{i=1}^{N} x_{ik}^d \bigg/ \sum_{i=1}^{N}\sum_{k'=1}^{D} x_{ik'}^d,$$

is used, which satisfies $$\sum_{k=1}^{D} p_{sk} = 1.$$

Likewise, for the Gaussian case, the mean and variance for feature k are maximum likelihood estimates based on the entire database. For Bernoulli (as well as multinomial) parameters, one can follow the example of [McCallum & Nigam. 1998] and "pad" each of the e.g., word counts by adding a small positive value, equivalent to a Bayesian learning approach, in order to avoid having probability estimates that are identically zero.

Mixed Continuous/Discrete Feature Space Alternative Model

Anomalous clusters may be very similar to normal (null) clusters with respect to most of the features, exhibiting atypical patterns only on a small subset of the features. Again, this may be true because an attacker will seek to be evasive, but also in other settings where many features (including many irrelevant ones) are measured precisely because it is a priori unknown which subset of features may exhibit an anomalous pattern. Thus, it is expected that most features may be uninformative for detecting anomalous clusters. Therefore, using the entire feature space for detecting anomalous clusters degrades detection accuracy [Soleimani et al., 2016]. The present invention jointly detects the salient feature subset and the anomalous sample subset defining an anomalous cluster, for continuous, discrete, and mixed feature spaces. To this end, elements of parsimonious modeling techniques are extended.

Unlike several existing group AD methods, the present invention jointly discovers candidate anomalous clusters and measures their level of atypicality based on a common (model selection) criterion (which in one embodiment is chosen to be BIC). Many existing group AD methods can only measure an anomaly score for clusters detected by a separate approach. This is one of the sources of their suboptimal detection performance. Moreover, while [Soleimani et al., 2016] used BIC to learn the alternative model, it did not also make (consistent) use of BIC as the hypothesis testing criterion and to assess statistical significance of detected clusters. The present invention does so. Moreover, it is noted that because the subspaces on which the anomalies manifest are in general low dimensional, each sample in the anomalous cluster, individually, may not exhibit a high degree of atypicality. It may only be that by considering all such anomalous samples collectively can one detect statistically significant anomalous clusters on high dimensional feature spaces, with many irrelevant features. Individual point (sample-wise) anomaly detection methods should achieve poor true detection versus false alarm accuracy in such settings.

This invention's null hypothesis is that all samples in the new data-sample batch $X_u$ were generated by the null model. Its alternative hypothesis is that a subset of samples in the new data batch is generated by a single (or by multiple) mixture components that are different from the M mixture components comprising the null model. Therefore, to capture this anomalous cluster of samples, the alternative model is built by adding one (or more) additional (parsimonious) components to the null model.

More formally, given $X_u = \{\underline{x}_n^{(u)}, n=1, \ldots, N_{test}\}$, where $\underline{x}_n^{(u)} = (\underline{x}_n^{(c,u)}, \underline{x}_n^{(d,u)})$, consisting, respectively, of continuous and discrete-valued subvectors, of dimensions $D_c$ and $D_d$, respectively, the null hypothesis is:

$$x_n^{(u)} \sim \sum_{k=1}^{M} \alpha_k P[x^{(u)} \mid \theta_k], n=1, \ldots, N_{test},$$

where $P[\underline{x}_n^{(u)}|\theta_k]$ is the joint likelihood, conditioned on generation by mixture component k, of $\underline{x}_n^{(u)}$, which, e.g. for the case of conditionally independent continuous and discrete-valued subvectors, is the product of the continuous and discrete-valued subvector joint likelihoods.

The alternative hypothesis is that there exists a sample index subset $\mathcal{N}_a \subset \{1, 2, \ldots, N_{test}\}$ such that $\underline{x}_n^{(u)}, n \in \mathcal{N}_a$ is generated according to an alternative model, while $\underline{x}_n^{(u)}, n \in \bar{\mathcal{N}}_a$ are all generated according to the null model.

Several alternative model embodiments are as follows:

1. The alternative model embodiment is a hierarchical mixture, consisting of the null mixture model plus a separate single-component anomalous model whose parameters are identical to those of one of the M null mixture components (suitably chosen) except on an anomalous feature subset, with continuous-valued and discrete-valued feature index subsets $I_a^{(c)} = \{i_1^{(c)}, \ldots, i_{N_c}^{(c)}\}$ and $I_a^{(d)} = \{i_1^{(d)}, \ldots, i_{N_d}^{(d)}\}$, respectively. In one embodiment, conditioned on generation by the anomalous component model, the anomalous feature subvector and the subvector defined on the remaining features are assumed conditionally independent. Considering this case, on the continuous and discrete-valued anomalous feature subsets, the Gaussian and Bernoulli (or multinomial, or topic model) parameters deviate from those of the null (these parameters will be estimated using the the putative anomalous sample subset specified by $\mathcal{N}_a$. Moreover, on the continuous-valued anomalous feature subset, three example models are: 1) naive Bayes Gaussian; 2) full covariance Gaussian; 3) "nearly" naive Bayes Gaussian, but with sparse off main diagonal nonzero covariates. That is, even if the null model for the continuous-valued subvector is a naive Bayes Gaussian mixture, the anomalous component may model the continuous-valued anomalous feature subvector by a full covariance GMM (on the subvector). The implication here is that feature correlations may be important for distinguishing between anomalous samples and samples well-modeled under the null. Even if such correlations are not important, the alternative hypothesis is that the anomalous feature subvector is generated under a different model than under the null. Note that in all three examples above, it is assumed that an anomalous multivariate Gaussian component has a block diagonal covariance structure, with the two blocks associated with i) the anomalous continuous-valued feature subset, and ii) the remaining continuous-valued feature subset. Another case is where there may exist a sparse set of non-zero covariates between any pair of features such that one is from the anomalous subset and one is from the remaining subset.

2. The alternative model embodiment is a hierarchical mixture, consisting of the null mixture model plus a separate M-component mixture model, with each of these M mixture components one-to-one associated with a distinct null model mixture component, and with its parameters identical to those of the null component except on a (common) anomalous feature subset, with continuous-valued and discrete-valued feature index subsets $I_a^{(c)} = \{i_1^{(c)}, \ldots, i_{N_c}^{(c)}\}$ and $I_a^{(d)} = \{i_1^{(d)}, \ldots, i_{N_d}^{(d)}\}$, respectively. In one embodiment, conditioned on generation by any anomalous component, the anomalous feature subvector and the subvector defined on the remaining features are conditionally independent. Note that the anomalous feature subset is common across all M anomalous mixture components. Moreover, the modeling of the anomalous feature subset is assumed to be common across all M mixture components. In one embodiment, the component masses of the alternative model components may have different values than the component masses under the null model (in another embodiment, they are constrained to be the same). Again, even if the null model for the continuous-valued subvector is a naive Bayes Gaussian mixture, the anomalous components may model the continuous-valued anomalous feature subvector by a full covariance GMM (on the subvector), capturing correlations that are valuable for distinguishing null samples from anomalous samples. Also even if such correlations are not important, the alternative hypothesis is that the anomalous feature subvector is generated under a different model (but one common across all M anomalous mixture components) than under the null.

Objective Function for Assessing Putative Anomalous Clusters

Under the null model, no additional model parameters are needed to explain the unlabelled test sample batch $X_u$. Thus, the BIC model selection cost, associated with "explaining"/describing $X_u$ under the null model, is just the negative joint log-likelihood which, for the case of i.i.d. samples is:

$$BIC_{null}(\mathcal{X}_u) = -\sum_{n=1}^{N_{test}} \log\left(\sum_{k=1}^{M} \alpha_k P[\underline{x}_n^{(u)} \mid \theta_k]\right). \quad (4)$$

Here, there is no cost associated with the description of model parameters because all the model parameters were already learned to minimize a different BIC cost (defined on the null training set)—under this null hypothesis, no new parameters or models need to be learned, to explain generation of the new data batch $X_u$.

By contrast, under the alternative hypothesis, additional parameters are needed to specify the anomalous feature subset and to fully specify the aforementioned example alternative model(s). For concreteness, assume the first type of alternative model described previously, wherein there is a single alternative model component. Furthermore, assume the case where the multivariate Gaussian part of this component has a block diagonal covariance matrix structure (rather than allowing sparse covariates between the anomalous and non-anomalous feature subsets). Then, under the alternative hypothesis, the BIC model cost (associated with a putative anomalous cluster) can be written more generally as:

$$BIC_{alt}(\mathcal{X}_u, \mathcal{N}_a, I_a^{(c)}, I_a^{(d)}) = \quad (5)$$
$$\log(3) + \log(M) + C(N_c + N_d) + |\Theta_{alt}| \log\left(\sum_{n=1}^{N} v_n\right) -$$
$$\sum_{n=1}^{N_{test}} \left((1 - v_n) \log\left(\sum_{j=1}^{M} \alpha_j P[\underline{x}_n^{(u)} \mid \theta_j]\right) + v_n \log(P_{alt}[\underline{x}_n^{(u)} \mid \Theta_{alt}])\right).$$

Here, $v_n = 1$ if sample n belongs to $\mathcal{N}_a$ and $v_n = 0$ otherwise, with $P_{alt}[\underline{x}_n^{(u)} \mid \Theta_{alt}]$ the likelihood of a sample under the alternative model. Also, log(3) specifies which of three Gaussian configurations (naive Bayes, full, or nearly naive Bayes), log(M) specifies which of the M null components has an alternative model counterpart, and C(•) is the number of bits to specify the anomalous feature subset—this may (reasonably) depend upon a prior distribution that decreases monotonically with the number of features in the subset ($N_N+N_d$). Actually, under the "nearly naive Bayes" case, additional bits are also needed to specify which covariates are non-zero. These have been omitted here for clarity. Also, $|\Theta_{alt}|$ is the number of free model parameters needed to specify the joint distribution for these features. For example, in the case where the continuous-valued subvector is modeled by a naive Bayes Gaussian and the discrete (e.g., binary) features by Bernoulli distributions, $|\Theta_{alt}|=2N_c+N_d$, where the '2' accounts for the mean and variance parameters of each continuous-valued feature (with a single Bernoulli parameter for each discrete feature). Alternatively, in the full Gaussian case, $|\Theta_{alt}|=N_c+N_c(N_c-1)/2+N_d$. In the BIC framework, the usual (naive) description length/penalty for each model parameter is the logarithm of the sample size. However, more generally, this number is also the number of samples that were used to estimate each parameter. In the above case, based on the explicit use of hard, binary association of each sample with either null model generation or alternative model generation, the number of samples used to estimate a parameter under the alternative model is $$|\mathcal{N}_G| = \sum_{n=1}^{N} v_n.$$

In general this number will be much smaller than the total number of samples, $N_{test}$. Thus, making hard (top-level) associations, rather than using a true hierarchical mixture, with soft association of each sample with the null and alternative model hypotheses, may lead to a much more "reasonable" description length under the alternative hypothesis—use, instead, of $\log(N_{test})$ would over-penalize alternative model parameters and might lead one to falsely reject the alternative hypothesis.

The alternative model likelihood in (5) can be further specialized, depending upon the modeling assumptions. As one concrete example, suppose the alternative model's Gaussian covariance structure is naive Bayes. Let $z_i^{(c)}=1$ if continuous-valued feature i belongs to the anomalous subset and zero otherwise. Similarly, introduce binary indicator variables for the discrete (binary) features, $z_i^{(d)}$. Then, the joint sample likelihood under the alternative model can be expressed as:

$$P_{alt}[x_n^{(u)} | \Theta_{alt}] = \sum_{j=1}^{M} q_j \left( \prod_{i=1}^{D_c} P[x_{ni}^{(c)} | \theta_{ji,alt}^{c}]^{z_i^{(c)}} \right) \quad (6)$$

$$P[\underline{x}_n^{(u,null)} | \Theta] \left( \prod_{i=1}^{D_d} P[x_{ni}^{(d)} | \theta_{ji,alt}^{d}]^{z_i^{(d)}} P[x_i^{(d)} | \theta_i^{d}]^{(1-z_i^{(d)})} \right).$$

Here, $q_j$ is a binary indicator variable, which takes on value 1 if the alternative model is based on the j-th null component, and zero otherwise. Also, $P[\underline{x}_n^{(u,null)}|\Theta]$ is the joint likelihood of the non-anomalous continuous-valued feature subvector (i.e., consisting of all features i such that $z_i^{(c)}=0$). Note that this likelihood may not factor as a product over individual features—this depends on the structure of the null model. Likewise, in the case of a full covariance matrix under the alternative hypothesis, the joint likelihood on the continuous-valued anomalous feature subspace does not factor as a product, unlike the above equation.

Based on the above description, an alternative hypothesis (an anomalous cluster) embodiment is specified by: i) the anomalous sample subset $\mathcal{N}_G$ (specified by the $\{v_n\}$); ii) the anomalous feature subset $\{I_a\}$, specified by the $\{z_i\}$; iii) the $\{q_j\}$; iv) the chosen covariance structure of the multivariate Gaussian for the continuous-valued anomalous feature subset: and v) the parameters specifying the distributions on the continuous and discrete anomalous feature subsets. If there is an anomalous cluster specification such that $BIC_{alt}<BIC_{null}$, the null hypothesis is rejected. However, the greater the reduction in BIC, the more statistically significant the deviation from the null (and, thus, the more significant the detected anomalous cluster). Thus, in the spirit of a generalized likelihood ratio test, the best candidate anomalous cluster is sought—the one which minimizes the cost function $BIC_{alt}$ with respect to all parameters specifying the cluster. If there is no cluster with lower cost than $BIC_{null}$, the alternative hypothesis is rejected. Otherwise, for the detected cluster, its statistical significance is assessed, all its samples are removed from $X_u$, and then this (sequential cluster detection) process is repeated, until no further significant clusters are detected. Note, too, that the specification of the second alternative model is very similar, except that i) it does not require $\{q_j\}$ but ii) it may require alternative model component mass parameters $\{\alpha_j^{(a)}\}$.

Learning the Best Candidate Anomalous Cluster, Minimizing $BIC_{alt}$

An embodiment of the present invention (FIG. 4, 101 of FIG. 1) is the following optimization technique that is locally optimal. i.e., it identifies a candidate anomalous cluster that at least locally (if not globally) minimizes $BIC_{alt}$. It can be applied repeatedly to sequentially detect clusters, until no more significant clusters are found.

The following is an embodiment of locally optimal detection of an anomalous cluster.

1. Given: current test data-sample batch $X_u$.
2. Hard-assign each sample $\underline{x}_n^{(u)} \in X_u$ to the null mixture component that achieves greatest a posteriori probability, i.e., $\arg\max_j P[M=j|\underline{x}_n^{(u)}]$.
3. Determine the pair of continuous-valued feature i* and mixture component j* which together have the most outliers occurring under the null: i) each feature $x_{in}^{(u)}$ for all i,n is evaluated with respect to the mixture component to which the sample n is hard-assigned. (This is under the first alternative hypothesis model. Under the second alternative hypothesis model, outlierhood is assessed with respect to the mixture over all null components.); ii) outlierhood is assessed for a continuous-valued feature by a two-sided Gaussian p-value and based on a p-value threshold.
4. Initialize $v_n$ to 1 for all samples n that are outliers based on (i*,j*). Set all other $v_n$ to 0. Set $z_{i*}^{(c)}$ to 1 and set all other $z_i^{(c)}$ to zero. Set $q_{j*}$ to 1 and all other $q_j$ to zero. Set all $z_i^{(d)}$ to zero.
5. Initialize the Gaussian alternative model mean parameter for feature i*, $\mu_{i*}$ as the mean of all samples with $v_n=1$. Initialize the Gaussian alternative model variance parameter for feature i*, $\sigma_{i*}^2$ as the sample variance of all samples with $v_n=1$.
6. While there are no changes in $z_i$ or $v_n$ values in sweeping over all features and samples, do:
   (a) Use the ordering of all continuous-valued features by decreasing number of outliers under the null (with respect to the null component j*).
   (b) While there are continuous-valued feature changes, do over all continuous-valued features:
      i. Unless feature i is the only feature such that $z_i^{(c)}=1$, compare the BIC cost with the current $z_i^{(c)}$ value with the BIC cost for the choice $1-z_i^{(c)}$ (if $z_i^{(c)}=0$ currently, estimate $\mu_i$, $\sigma_i^2$ and, for the full covariance case, $\sigma_{i,i'}$, $i' \in I_a^{(c)}$ before computing the BIC cost).

ii. Switch the $z_i^{(c)}$ value if doing so reduces the BIC cost.

(c) Use the ordering of all discrete-valued features by decreasing number of outliers under the null with respect to component j*. In this case, a feature is an outlier if its probability (under the null component j*) is below a given threshold.

(d) While there are discrete-valued feature changes, do over all discrete-valued features:

i. Compare the BIC cost with the current $z_i^{(d)}$ value with the BIC cost for the choice $1-z_i^{(d)}$ (if $z_i^{(d)}=0$ currently, estimate the (e.g., Bernoulli) alternative parameter as the number of samples such that both $v_n=1$ and the discrete feature value is 1 divided by the number of samples such that $v_n=1$ before computing the BIC cost for the case $z_i^{(d)}=1$).

ii. Switch the $z_i^{(d)}$ value if doing so reduces the BIC cost.

(e) Order all samples in decreasing order of the reduction in BIC cost (associated with switching the binary $v_n$ value).

(f) While there are no further changes in $v_n$ values, do:

i. Compare the BIC cost for the current $v_n$ value with the BIC cost for the choice $1-v_n$.

ii. Switch the $v_n$ value if this decreases the BIC cost. Update all alternative model parameters (simple updates, which "correct" the current parameter estimates to account for a one-sample change) if $v_n$ switches state.

7. Assess statistical significance of the current cluster.

8. Return the current cluster description, its associated BIC value, and its significance. If the cluster is deemed significant, remove all of its samples from $X_u$.

Regarding this embodiment of locally optimal detection of an anomalous cluster:

1. Note that the above approach considers all features as candidate anomalous features—i.e., a feature modeled using the shared distribution under the null model could be part of an alternative model's anomalous feature subset.

2. The above embodiment considers both features and samples one at a time. For features, there are two reasons: i) this removes the possibility that all features will simultaneously switch "off" (causing an empty anomalous feature subset): ii) In the case of a full covariance matrix, it is complicated and quite computationally costly to consider the effect on the covariance matrix (and, hence, on the BIC cost) associated with multiple features simultaneously joining (or multiple features simultaneously leaving) the anomalous feature subset. For samples, the reason is that the BIC parameter cost is $$\frac{1}{2}\log\left(\sum_{n=1}^{N_{test}} v_n\right), \text{i.e.,}$$

it has complicated nonlinear dependence on the $\{v_n\}$.

3. The above embodiment does not consider sparse covariates between the anomalous and non-anomalous feature subsets. Optimization of such covariates can be achieved by incorporating the gradient updates and other parameter updates specified in [Markley et al., 2010].

4. The above embodiment initializes the anomalous cluster using the (mixture component, continuous feature) pair that yield the largest number of outliers. This is easily extended to allow multiple initializations (e.g., the top K (mixture component, continuous feature) pairs, in terms of outliers), with the best resulting candidate cluster the one with the smallest BIC cost. Allowing multiple initializations should make the approach more robust, as the solution will not sensitively rely on the (component, feature) pair with the most outliers being a good seed initialization for the anomalous cluster.

5. The above embodiment initializes the anomalous cluster based on the "most anomalous" continuous-valued feature. Alternatively, the initialization could be based on the most anomalous discrete-valued feature. It could also instead be based on the most anomalous pair of features (either both continuous-valued, both discrete-valued, or one continuous-valued and one discrete-valued).

6. For clarity's sake, the above embodiment assumes the discrete features are binary and modeled by (parsimonious) Bernoulli distributions. This is easily extended to consider discrete-valued non-binary features and, e.g., discrete bag-of-word features modeled by a (parsimonious) multinomial distribution. It can also be extended for the case where the discrete count features are modeled using parsimonious topic models. For this case, such extension is consistent with the mixed continuous-discrete stochastic data generation described previously, with each topic associated one-to-one with one of the Gaussian mixture components used to model the continuous-valued feature subvector.

7. The above embodiment considers features in decreasing order of the number of samples that are outliers and considers samples in decreasing order of the change in the BIC cost. Other embodiments may define the order of consideration of features and samples based on other criteria. Regardless, the optimization technique is locally optimal with respect to the BIC objective function.

In many application contexts, the test-data batch is partitioned across multiple detectors that are not proximal to each other. Also, the test data batch may be too large to cost-effectively transmit and pool in one central location in a short period of time. In these cases with "data locality" issues, each detector can locally execute the present invention or another sample anomaly (outlier) detector, on its test-data partition, using a low statistical significance threshold. The outlier samples, typically being a very small subset of the test batch, and any associated contextual information (representative features, BIC cost), can be feasibly communicated to a central location where the present invention resides and can operate upon them. See FIG. 3. In this way, the complexity of the present invention is significantly reduced without significant degradation in accuracy. It is obvious to one of ordinary skill in the art how a hierarchy of more than two stages of anomaly detectors could operate on a very large and spatially distributed test set of samples, where some detectors could operate on both their own local test set partition in addition to outliers received by other detectors.

A parallel implementation could also operate with all detectors proximal to a large test dataset (no data locality issue). Alternatively or in addition, multiple initializations of the present invention can be explored in parallel to reduce overall learning complexity. Such parallel embodiments can be implemented on current platforms like Spark or Flink.

Assessing Statistical Significance of Candidate Clusters

If a candidate cluster achieves lower BIC cost than under the null model, the null model can be rejected. However, some candidate clusters may achieve very modest reductions in the BIC cost—which may be the result of chance (associated with noise in the test batch $X_u$). Thus, to make confident cluster detections, as well as to give a statistical confidence score to each such detection, it is prudent to consider statistical significance assessment of detected clusters—even if a candidate cluster reduces the BIC cost relative to that of the null model, candidates with low confidence can still be rejected (which may reduce false positives at some expense in missed detections). There are several approaches that can be used to assess statistical significance of detected clusters. Instead of the nonparametric bootstrap testing proposed specifically for discrete topic models applied to document datasets [Soleimani et al., 2016], two embodiments are explained here for mixed continuous-discrete feature spaces, e.g., for network packet-flows the discrete features are packet directions and the packet sizes are taken as continuous features.

First, note that the BIC cost function is an approximate log posterior for the data given the model hypothesis (the posterior is the integrated data likelihood, where one essentially computes the expectation of the data likelihood with respect to a prior distribution defined on the parameter space), i.e., BIC≈log(P[$X_u$|$\mathcal{H}$]), where $\mathcal{H}$ is a model hypothesis. Thus, if it is assumed that the null and alternative hypotheses are equally likely (The choice of prior on hypotheses may not be crucial as the "size" of the candidate cluster grows (potentially either the number of samples or the number of feature dimensions in the anomalous cluster), since the data likelihood dominates the prior (in a product of the two) as this size grows.), Bayes rule gives the posterior probability of the alternative hypothesis:

$$P[\mathcal{H}_{alt} | X_u] = \frac{e^{BIC_{alt}}}{e^{BIC_{alt}} + e^{BIC_{null}}}. \tag{7}$$

In principle, if this probability is true/accurate, then in accepting the candidate cluster the false positive rate will be 1−P[$\mathcal{H}_{alt}$|$X_u$]. Thus, P[$\mathcal{H}_{alt}$|$X_u$] gives a principled measure of confidence and in principle allows setting the false positive rate (one could instead use a randomized decision rule to set the false positive rate to a different value than 1−P[$\mathcal{H}_{alt}$|$X_u$]). This also provides a theoretically-grounded basis for ranking clusters according to their significance.

At the same time, note that BIC is only a (Laplace) approximation of the log model posterior. Moreover, assuming the priors on the two hypotheses are equal may not be reasonable and does influence the posterior probabilities of the two hypotheses if the size of the candidate cluster is modest (which may often be the case in practice). Thus, an alternative approach to assessing statistical significance is to apply standard bootstrap significance testing. Here, suppose that the (assumed to be large) null dataset is divided into two subsets, one for training and the other to be used for assessing significance. From the latter subset, B times randomly draw |$X_u$| samples. For each of these B batches, minimize BIC to find the best alternative model and measure the associated value $BIC_{alt}(b)$, b=1, ..., B. Note that B may be chosen quite large, such as $10^4$ or $10^5$: this will require substantial computation to learn B alternative models. However, these B optimizations can be performed off-line, prior to applying hypothesis testing to the new data batch $X_u$. Then, the empirical p-value for $BIC_{alt}$ can be measured as the proportion of bootstrap values $BIC_{alt}(b)$ that are smaller than $BIC_{alt}$. This p-value can be used to assess significance of a putative cluster, as well as to rank detected clusters. Since clusters are detected sequentially and then removed from $X_u$, strictly speaking one should reapply the bootstrap every time one removes a cluster, since this reduces the batch size, starting from |$X_u$|. However, this cannot be done offline, as the number of samples in a detected cluster (to be removed) is unknown a priori. Moreover, this would be quite costly computationally. Alternatively, in practice one can assume that the size of an anomalous cluster is quite small relative to the size of the data batch, and thus reuse the same bootstrap values $BIC_{alt}(b)$, b=1, ..., B in assessing the significance of each sequentially detected cluster. If this is not the case, one can precompute bootstrap samples K times, each time assuming a different batch size. Then the empirical BIC distribution associated with the "nearest" batch size can be used, in assessing the significance of a detected cluster. Also note that for the example where the discrete-valued feature space is a bag-of-words representation of document samples, and if the number of samples available for bootstrap sampling is limited, then a nonparametric bootstrap strategy can be alternatively used for generating synthetic bootstrap document samples, in assessing a cluster's statistical significance.

Actively Learning

The present AD invention is a powerful approach for making joint (cluster) detections, which are essentially putative zero-day phenomena. However, some of these detected clusters will be innocuous, and some will be uninteresting (corresponding perhaps to measurement errors, miscalibration, etc.). Thus, there is still great need for an automated way to assess detected clusters and determine whether they are putatively malicious/interesting (worth being examined by an operator, worth validating as an unknown phenomenon and perhaps assigning a suitable, descriptive identifier (naming), worth generating an alert) or not. A framework for active learning to distinguish between attack (or highly suspicious/interesting) and innocuous/uninteresting clusters of anomalies and, more generally, for classifying these clusters (to existing known categories or to an "unknown" category) is now described.

The active learning approach can be applied for various class posterior models. In the following embodiment, it is developed assuming a "nearly standard" logistic regression classifier form, albeit with log p-values as features and with weight constraints:

$$P(C = \text{"suspicious"} | p) = \frac{\exp\left(w_0 - \sum_{i=1}^{N}\left(w_i \log p_i + \sum_{j \neq i} \beta_{ij} \log p_{ij}\right)\right)}{1 + \exp\left(w_0 - \sum_{i=1}^{N}\left(w_i \log p_i + \sum_{j \neq i} \beta_{ij} \log p_{ij}\right)\right)}, w_i \geq 0 \text{ for all } i \tag{8}$$

based on the parameter set $\Theta = \{\{w_i\}, \{\beta_{ij}\}\}$. Here, two classes are assumed, one "innocuous" (or known) and the other "suspicious" (or unknown). This model is easily extended to handle multiple known classes.

In classifying a sample, $p_i$ is a p-value of a sample for feature i, $p_{ij}$ is a p-value of the sample for the (i,j) feature pair, and C is the class label of the sample. These p-values are measured as follows. First, consider continuous-valued features. For all single features and all pairs of features, one embodiment of the present invention models these continuous distributions using Gaussian Mixture Models (GMMs) *, and uses both first and second order mixture p-values to quantify the anomalies with respect to these independently learned GMMs (where the GMMs are learned on the available null training set). Consider any pair of features $\underline{Y}=(X_i,X_j)$, $1 \leq i \neq j \leq D_c$, from the collection of $D_c$ continuous-valued features, modeled by a bivariate GMM under the null. Let $\{\delta_k\}_{k=1}^{K_{ij}}$, $0 \leq \delta_k \leq 1$, $$\sum_{k=1}^{K_{ij}} \delta_k = 1,$$

be the prior probabilities for the ($K_{ij}$) mixture components, with associated component densities $\{f_{\underline{Y}|k}(\underline{y}|\theta_k)\}_{k=1}^{K_{ij}}$, and $\theta_k=(\underline{\mu}k, \Sigma_k)$ the (mean vector, covariance matrix) parameter set for the $k^{th}$ density. The mixture density is thus $$f_{\underline{Y}}(\underline{y}) = \sum_{k=1}^{K_{ij}} \delta_k f_{\underline{Y}|k}(\underline{y} \mid \theta_k).$$

Given such a mixture null, the p-value of (the probability that a two-dimensional feature vector will be ore extreme than the given observed vector) $\underline{y}=(x_i,x_j)$ is $$p_{ij}(\underline{y}) = \sum_{k=1}^{K_{ij}} P[M = k \mid \underline{y}] e^{-r_k^2(\underline{y})/2}.$$

Here, the mixture posterior is $$P[M = k \mid \underline{y}] = \frac{\delta_k f_{\underline{Y}|k}(\underline{y} \mid \theta_k)}{\sum_{m=1}^{K_{ij}} \delta_m f_{\underline{Y}|m}(\underline{y} \mid \theta_m)}$$

and $r_k^2(\underline{y})$ is the squared Mahalanobis distance between $\underline{y}$ and $\underline{\mu}_k$ for the $k^{th}$ GM component.

*It is suggested that each single feature and each pair of features be separately modeled by GMMs (while ignoring higher-order feature sub-collections) to avoid the curse of dimensionality in learning the parameters, while at least capturing dependencies between all pairs of features. This also avoids intractable marginalizations of the joint pdf on the full feature space, e.g., for the NIDS application, when considering evaluation of p-values involving the size of packet j jointly with the binary presence/absence value for packet m.

Note that $p_{ij}(\underline{y})$ is really the expected p-value, with the expectation taken with respect to the mixture posterior pmf. In a similar fashion, one can also calculate a set of mixture-based p-values for single (univariate) features, denoted $\{p_i(x_i), i=1, \ldots, D_c\}$. In this case, complementary error functions are used to measure the p-value conditioned on each mixture component, with the mixture-based p-value again the expected p-value.

Next, considering discrete-valued features, $p_i(x_i)$ is just the probability of the observed discrete value $x_i$ under the null and $p_{ij}(x_i,x_j)$ is the probability of the observed discrete-valued pair $(x_i,x_j)$ under the null. The maximum likelihood estimates of these probabilities, based on the null training set, are obtained based on frequency counts (with partial counts added in numerator and denominator to avoid zero probability estimates).

Finally, one can also evaluate mixture p-values on individual continuous-valued features conditioned on the values of individual discrete-valued features. Toward this end, one must learn a separate GMM for each continuous-valued feature conditioned on each possible value, for every discrete-valued feature. This is achieved for continuous feature $X_j$ and discrete feature $F_i=f_i$ by considering the subset of the null training samples for which discrete feature $F_i$ takes on value $f_i$ and learning the GMM for $X_j$ on this subset of the null training set.

An Embodied Application to Unsupervised NIDS

To capture the intrinsic behavior of botnet traffic, note that in the Command-and-Control (C&C) phase (communication between Bot masters and slaves for coordination or attacks), most botnet traffic involves master(s) periodically giving command (control) messages, whereas the slaves execute the given commands (toward e.g., evading detection, furthering intrusive behavior, unauthorized exfiltration of private data or otherwise harming the infected end-hosts, effecting an overt attack—e.g., a DDoS attack, on a third party). Nominal/background Web (port 80) traffic, on the other hand, tends to predominantly involve server-to-client communication. This said, nominal port-80 activity is extremely complex and largely passes through public security devices (firewalls, antivirus systems) unimpeded for the sake of usability—this is why some botnets employ port 80 for C&C communications.

To consider the particular bidirectional packet-size sequence features of network flows, one can use a representation based on the first N (experimentally, N=10) packets after the three-way handshake of each TCP flow. Then a feature vector of dimension D=2N was defined, specified by the sizes and directionalities of these N packets. A "reference" packet flow was defined to be alternating between client-to-server (CS) and server-to-client (SC). A zero packet size was thus inserted between two consecutive packets in the same direction to indicate an absence of a packet in the other direction. For example, if the bidirectional traffic is strictly SC, a zero will be inserted after each SC packet size. This "raw" 2N-dimensional feature representation preserves bidirectional information of a given TCP flow.

As discussed previously, both the presence of packets in given directions and the sizes of packets may be informative in identifying anomalous traffic. Accordingly, a set of anomalous scores are defined to quantify this. Considering the previously defined 2N-dimensional feature vector $\underline{x}=(x_1, x_2, \ldots, x_{2N})^T$, let $I(\underline{x}_1)=(I(x_1), I(x_2), \ldots, I(x_{2N}))^T$, with $I(x)=1$ if $x>0$ and 0 otherwise, a binary vector, to specify the packet direction sequence. To reduce the number of parameters to model the joint distribution for $I(\underline{x})$, Here, consider an example based on the former. The joint dependence tree distribution for a vector of discrete-valued random variables is the model which maximizes the likelihood over the training data under the constraint that the distribution factors as a product of first and second-order probabilities. Hence, based on this special Bayesian Network structure, $P[I(\underline{x})]$ factorizes as:

$$P[I(\underline{x})]=P[I_{j_1}]P[I_{j_2}|I_{j_1}] \ldots P[I_{j_D}|I_{j_{D-1}}],$$

where $j_1=j_1(\bar{x})$ denotes the root node index of the learned Bayesian Network for the web-flow sample with direction vector $I(\bar{x})$. In the following, to simplify notation, $I_j$ is used to denote $I(x_j)$.

The maximum likelihood estimates of the probabilities are obtained from frequency counts. For all estimates, small additional counts (e.g., one additional value) are added to avoid assigning 0 probabilities. That is, $$P[I_j = 1] = \frac{N_j^+ + 1}{T_l + 2},$$

with $N_j^+$ representing the number of web-flows belonging to $X_l$ with positive packet size in the $j^{th}$ position. Similarly, $$P[I_j \mid I_m] = \frac{P[I_j, I_m]}{P[I_m]},$$

with $$P[I_j = 1, I_m = 1] = \frac{N_{jm}^{++} + 1}{T_l + 4}$$

and $N_{jm}^{++}$ representing the number of training web flows that have positive packet size in the $\{j,m\}$ position pair. Similarly, $$P[I_j = 0, I_m = 1] = \frac{N_{jm}^{0+} + 1}{T_l + 4},$$

$$P[I_j = 1, I_m = 0] = \frac{N_{jm}^{+0} + 1}{T_l + 4}, \text{ and}$$

$$P[I_j = 0, I_m = 0] = \frac{N_{jm}^{00} + 1}{T_l + 4}.$$

Note that $P[I(\underline{x})]$ is a product of D unweighted probabilities, quantifying the unweighted total anomaly score over the D dimensions, for the packet direction sequence. The low-order constituent probabilities of $P[I(\underline{x})]$ will be exploited as the basis for derived p-value features input to the classifier.

Next consider all single continuous-valued features and all pairs of continuous-valued features, considering only the positive entries (non-zero packet sizes). In one embodiment of the present invention, these are modeled using Gaussian Mixture Models (GMMs), with mixture p-values then measured as discussed before. If an individual packet is missing or if any of the two packets in a pair (i, j) is missing, the associated p-value is set to 1. Then the derived feature vector is:

$$z = (P[I_{j_1}], P[I_{j_k} \mid I_{j_{k-1}}], p_i(x_i), p_{ij}(\underline{y}) : \forall i,$$

$$j, k, 1 < k \leq D, 1 \leq i < j \leq D) \in (0, 1]^{2D + \binom{D}{2}}.$$

Note that this is a fixed-dimensional feature representation for every flow. Note also that the log of the entries in z will be taken, which means that p-values set to 1 have log p-values that are zero—taking the log thus effectively eliminates such features, consistent with the fact that they are missing. The log of the $\underline{z}$ feature vector is the input to the (non-negatively) weight-constrained logistic regression classifier defined earlier.

If, instead of classifying a sample, one is classifying a cluster, $p_i$ and $p_{ij}$ represent the average mixture p-values, over all samples that belong to the cluster. The classifier linearly weights these log p-value derived features, in evaluating the probability that a sample (cluster) belongs to each possible category: suspicious, or one of the known classes (or more generally, whether it originates from an unknown class). The following observations can be made about this embodiment, based on logistic regression and log p-value features.

If the parameters are initialized as equal, $w_1 = w_2 = \ldots = w_N = w > 0$ and $\beta_{ij} = \beta > 0$ for all i, j, then ordering samples (clusters) by their a posteriori probability of being suspicious (belonging to the unknown class) is equivalent to ordering them by their log-aggregate p-values (aggregate atypicality), i.e., initially, before any active learning, the model is unbiased about which features indicate suspicion (unknown class), treating the (log-aggregate) "most anomalous" sample as the "most suspicious" one.

Imposing non-negative weights on the log p-values (which are negative) is consistent with the present invention's inductive bias that "suspicious" (unknown class) is a subset of what is anomalous—if atypicality of feature i is suspicious, this is reflected by choosing a large value for $w_i$. However, if it is known (has been learned) that feature i's atypicality is irrelevant to suspicious-innocuous (known-unknown) class discrimination, this can be properly reflected by setting $w_i = 0$. Imposing these weight constraints leads to highly sparse solutions, with many weights set to zero. Thus, a low-dimensional salient signature determines the class for each cluster (sample).

Note that the $\beta_{ij}$ terms are interaction terms—a large positive $\beta_{ij}$ implies an increase in the likelihood of being suspicious when features i and j are jointly atypical.

Monotonic Sample Ordering (Generalization) Property

Let $\beta_{ij} = 0$ for all i, j and suppose sample (cluster) n, with (single-feature) p-value vector $\underline{p}_n$, is labeled "innocuous". Suppose that the classifier is adapted to correctly classify sample (cluster) n, i.e., such that $P(C_n = \text{"suspicious"} \mid \underline{p}_n) < 0.5$ (for the two-class case), where $C_n$ is a class label of sample (cluster) n. Now consider any other sample (cluster) m such that $p_{i,m} \geq p_{i,n}$ for all features $i = 1, \ldots, N$. Clearly, $$P(C_m = \text{"suspicious"} \mid \underline{p}_m) \leq P(C_n = \text{"suspicious"} \mid \underline{p}_n) < 0.5,$$

i.e., if sample (cluster) n is learned to be classified correctly, all samples (clusters) m that are more typical than sample (cluster) n have also been learned to be correctly classified. The same also holds in the alternative case, considering that $\underline{p}_n$ is suspicious and considering the set of samples (clusters) more atypical than $\underline{p}_n$. This is a type of generalization that comes from the inductive bias of constraining weights to be non-negative, consistent with "suspicious" being a subset of "anomalous".

Semisupervised Active Learning Objective Function

At the outset, few or no labeled suspicious (unknown class) examples may be available, but (even without human expert inspection) plentiful examples can be reliably labeled as "innocuous" (or to the set of known classes) based on high typicality (relatively large aggregate p-values). Essentially, there are two classes (an unknown class and a known class subset, with the known class subset potentially a union of multiple known categories), but possibly with labeled instances initially available for only one of them. Thus, at the outset, the present invention's active learning objective may amount to a "one-class classification" problem.

One embodiment of the present invention employs a kind of pool-based active learning (104 of FIG. 1), with repeated selection of a sample (cluster) from the test batch for labeling (105) and then adaptation of the existing classifier in light of this new labeled example. What distinguishes different pool-based schemes are: 1) the criterion used for selecting the sample to forward to the oracle (operator) for labeling (based e.g., on forensic analysis) at each step and 2) the learning framework for adapting the classifier model in light of the newly labeled sample (cluster).

A key insight in [Qiu et al., 2017b] is that the unlabeled data samples can be used as a type of "regularizer", minimizing the "amount" of adaptation performed in light of each newly labeled sample (cluster). This is achieved by maximizing decision uncertainty on the unlabeled samples, even while maximizing the class posterior log-likelihood on the labeled samples. This gives a practical resolution to the fundamental active learning question of how much learning to do, in light of each new labeled sample (cluster). Compared to the previously proposed, standard minimum entropy regularization approach [Grandvalet and Bengio, 2004], which minimizes decision uncertainty on unlabeled samples, semisupervised maximum entropy (Maxent) regularization avoids over-training, especially when the rare (or unknown) category is underrepresented, i.e., during the early stages of active learning. Moreover, even more importantly, by retaining high class decision uncertainty in unlabeled regions of feature space, maximum entropy regularization makes it easy to identify good samples (clusters) to select for labeling (labeling samples in regions with high class decision uncertainty can have a profound effect in improving the classifier's generalization performance). Finally, this semisupervised maximum entropy regularized objective is a convex objective function, with a unique global minimum, unlike standard minimum entropy regularization. Maximum entropy regularization was demonstrated to greatly outperform minimum entropy regularization, especially during the early phase of active learning. i.e., either before an unknown class has been discovered, or when only a small subset of its samples have been labeled. During this phase, minimum entropy regularization may in fact fail to discover the unknown class.

To achieve this semisupervised approach, the (purely supervised) class posterior log-likelihood objective function can be modified by adding an unlabeled penalty term that tries to retain high class entropy for each of the unlabeled samples. Thus, while adapting the model parameters so that the class posterior agrees with target values (1,0) and (0,1) for labeled suspicious and innocuous samples, respectively, the penalty term ensures that the class posterior at the same time minimally deviates from a uniform (½, ½) distribution for each of the unlabeled samples. This is achieved by a sum of cross entropies cost function on the unlabeled samples, which preserves a convex learning problem for the (logistic regression function) weight parameters. By preserving class uncertainty on the unlabeled samples, this semisupervised learning approach avoids overfitting within an active learning setting wherein there are scarce labeled samples for at least one of the classes. Note again that this approach represents a fundamental paradigm shift from previous semisupervised works, which minimize entropy on the unlabeled samples—within an active learning setting, with preciously few labeled samples, minimizing entropy appears to be the "wrong" objective, which will tend to lead to over-fitting based on few labeled examples and which is also a poor approach for discovering samples from unknown classes. In the latter stages of active learning, after many samples have been labeled, minimizing class uncertainty on the unlabeled samples may be a good choice (it is essentially consistent with margin maximization). However, in the early stages, a main concern should be avoiding over-training on the small number of labeled examples and discovery of unknown classes. Maxent regularization better achieves these goals.

Class imbalances can be addressed and the appropriate weight to give to the unlabeled regularizer can be determined by, for example, "equalizing" the contribution to the objective function coming from the labeled suspicious and labeled (known) innocuous subsets. That is, let the weight on the labeled innocuous samples $\alpha_i^{(t)}=1$ ($i \in I^{(t)}$) and choose the weight on the labeled suspicious samples $\alpha_s^{(t)}=|I^{(t)}|/|S^{(t)}|$ ($s \in S^{(t)}$), where $I^{(t)}$ and $S^{(t)}$ are the current sets of labeled "innocuous" and "suspicious" samples, respectively. What remains is the choice of the weight on the unlabeled samples $\alpha_u^{(t)}$. It appears more difficult to find a principled, "universal" choice for the weight $\alpha_u^{(t)}$, since this controls the amount of regularization. Instead, it was suggested to set $\alpha_u^{(t)}$ using a cross-validated error rate measure, based on the labeled samples "seen until now", i.e., $I^{(t)}$ and $S^{(t)}$.

Sample (Cluster) Selection Criteria for Active Learning

Under pool-based active learning, the oracle ground-truth labels the informative samples (clusters) sequentially forwarded by the learner. Several alternative active learning sample selection strategies include:

uncertainty sampling: pick the unlabeled sample (cluster) with the highest entropy, as measured by the current classifier's posterior (8).

most likely unknown (MLU) sampling: pick the unlabeled sample (cluster) that has the highest probability of belonging to the unknown class.

random sampling: pick the unlabeled sample (cluster) randomly.

most likely known (attack) sampling: pick the unlabeled sample (cluster) most likely to represent a known actionable (e.g., NIDS attack) class, e.g., a known botnet class.

Note that these sample (cluster) selection criteria are consistent with different, competing objectives: i) accurately learning a classifier on the known classes with as few labelings as possible; ii) discovering unknown classes with as few labelings as possible; iii) forwarding the most actionable samples (clusters). It is possible to simultaneously consider all of these objectives by using a mired sample selection strategy (wherein multiple of the above criteria are randomly selected from, with different probabilities commensurate with the priority of the associated objective). In this way, it is possible to learn an accurate classifier on known categories, discover unknown classes, and forward the most actionable samples (clusters).

As the present invention is generative, it naturally deals with data samples having missing features.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

Computing Environment

Figure 5:
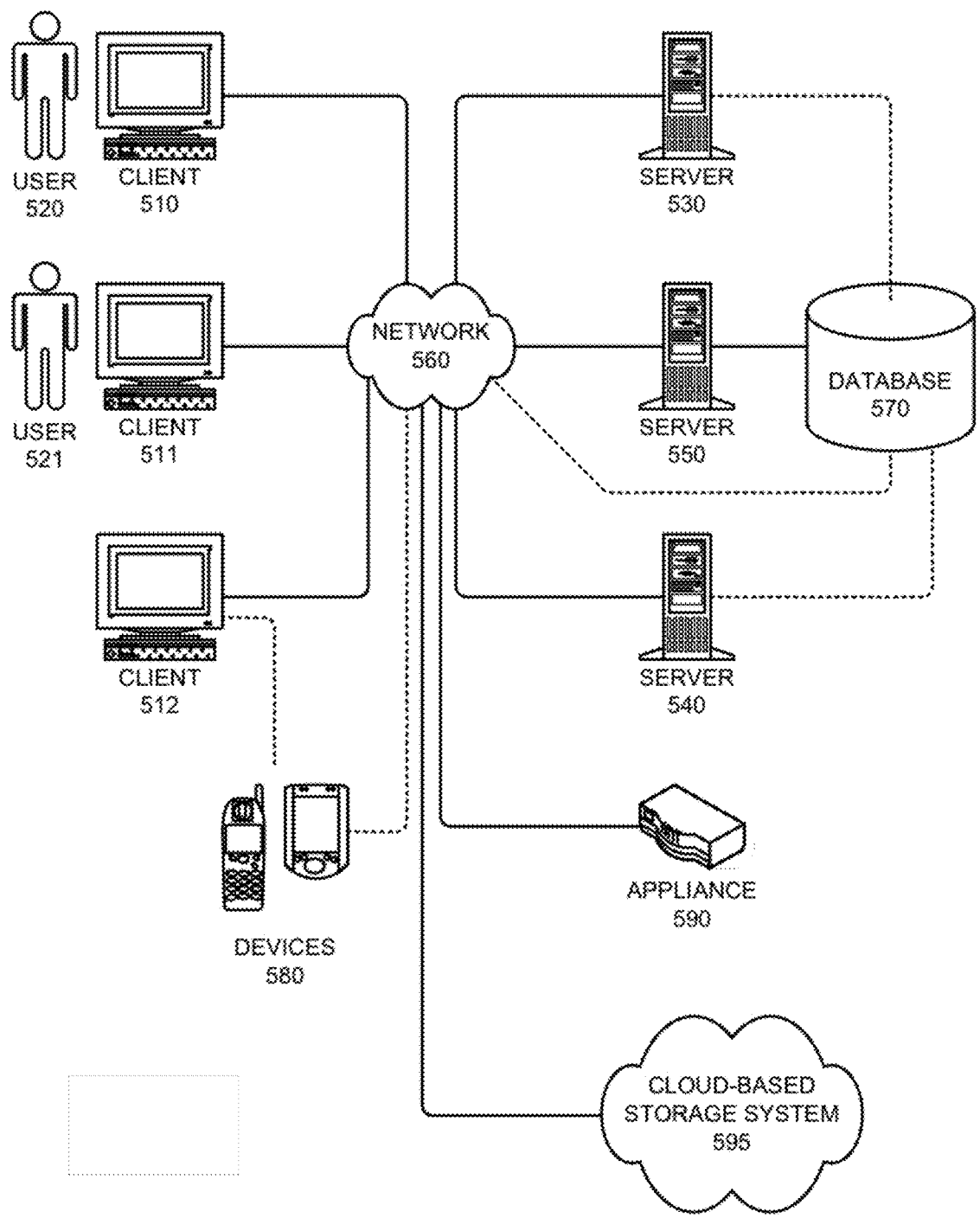
FIG. 5 illustrates a computing environment in accordance with an embodiment.

In summary, embodiments of the present invention facilitate performing anomaly detection. In some embodiments of the present invention, techniques for performing anomaly detection can be incorporated into a wide range of computing devices in a computing environment. For example, FIG. 5 illustrates a computing environment 500 in accordance with an embodiment of the present invention. Computing environment 500 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 5, computing environment 500 includes clients 510-512, users 520 and 521, servers 530-550, network 560, database 570, devices 580, appliance 590, and cloud based storage system 595.

Clients 510-512 can include any node on a network that includes computational capability and includes a mechanism for communicating across the network. Additionally, clients 510-512 may comprise a tier in an n-tier application architecture, wherein clients 510-512 perform as servers (servicing requests from lower tiers or users), and wherein clients 510-512 perform as clients (forwarding the requests to a higher tier).

Similarly, servers 530-450 can generally include any node on a network including a mechanism for performing anomaly detection. Servers 530-550 can participate in an advanced computing cluster, or can act as stand-alone servers. For instance, computing environment 500 can include a large number of compute nodes that are organized into a computing cluster and/or server farm. In one embodiment of the present invention, server 540 is an online "hot spare" of server 550.

Users 520 and 521 can include: an individual; a group of individuals; an organization; a group of organizations; a computing system; a group of computing systems; or any other entity that can interact with computing environment 500.

Network 560 can include any type of wired or wireless communication channel capable of coupling together computing nodes. This includes, but is not limited to, a local area network, a wide area network, or a combination of networks. In one embodiment of the present invention, network 560 includes the Internet. In some embodiments of the present invention, network 560 includes phone and cellular phone networks.

Database 570 can include any type of system for storing data in non-volatile storage. This includes, but is not limited to, systems based upon magnetic, optical, or magneto-optical storage devices, as well as storage devices based on flash memory and/or battery-backed up memory. Note that database 570 can be coupled: to a server (such as server 550), to a client, or directly to a network. Alternatively, other entities in computing environment 500 (e.g., servers 530-450) may also store such data.

Devices 580 can include any type of electronic device that can be coupled to a client, such as client 512. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 580 can be coupled directly to network 560 and can function in the same manner as clients 510-512.

Appliance 590 can include any type of appliance that can be coupled to network 560. This includes, but is not limited to, routers, switches, load balancers, network accelerators, and specialty processors. Appliance 590 may act as a gateway, a proxy, or a translator between server 540 and network 560.

Cloud based storage system 595 can include any type of networked storage devices (e.g., a federation of homogeneous or heterogeneous storage devices) that together perform anomaly detection techniques for one or more servers and/or clients.

Note that different embodiments of the present invention may use different system configurations, and are not limited to the system configuration illustrated in computing environment 500. In general, any device that includes computational and storage capabilities may incorporate elements of the present invention.

Figure 6:
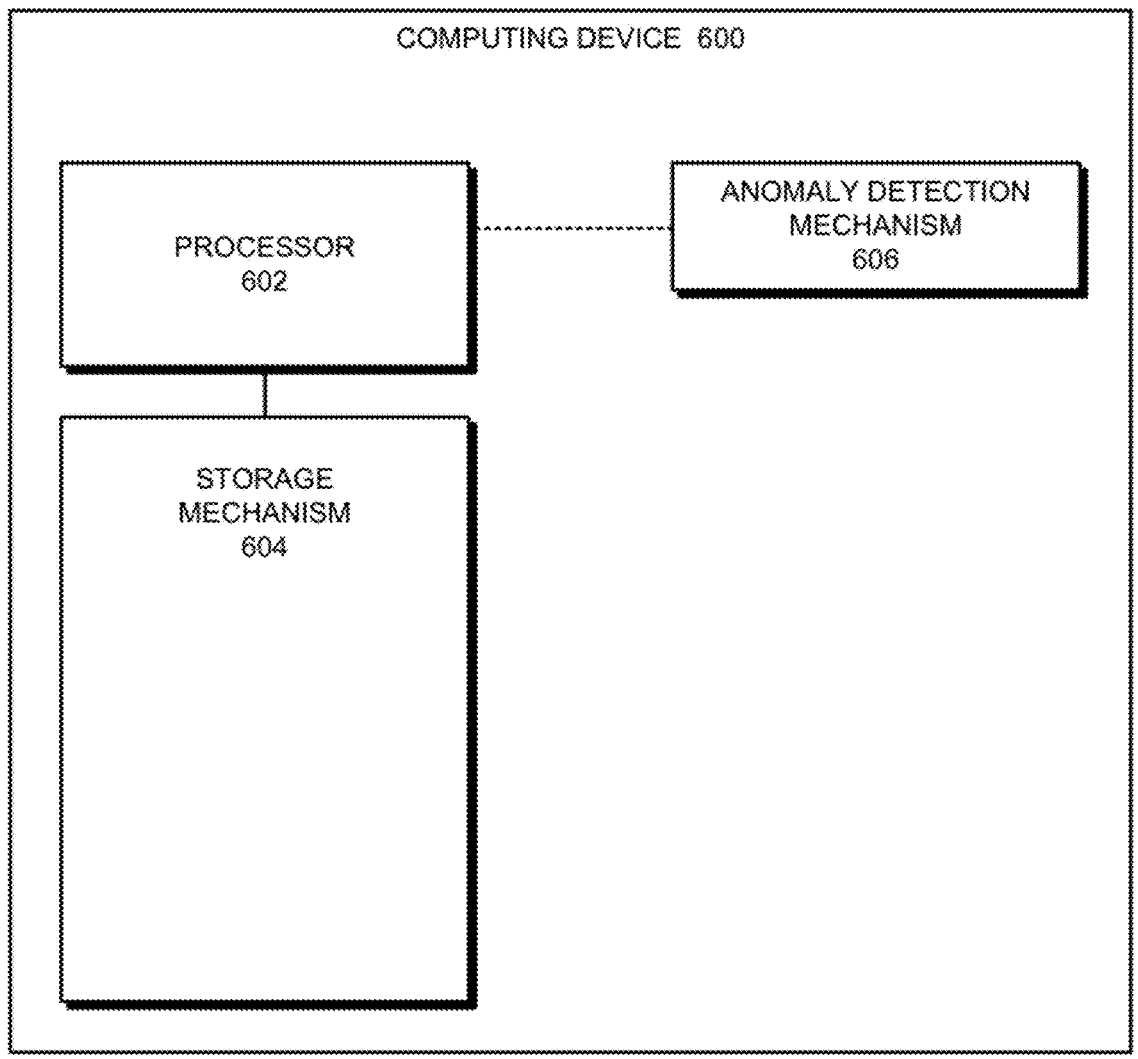
FIG. 6 illustrates a computing device in accordance with an embodiment.

FIG. 6 illustrates a computing device 600 that includes a processor 602 and a storage mechanism 604. Computing device 600 also includes an anomaly detection mechanism 606. In some embodiments, computing device 600 uses processor 602, anomaly detection mechanism 606, and storage mechanism 604 to perform anomaly detection techniques. For instance, storage mechanism 604 can store training sets of labelled samples and unlabelled samples that are analyzed by processor 602 and anomaly detection mechanism 606. Program instructions executing on processor 602 can operate upon such samples to generate a parsimonious null mixture model and/or otherwise characterize sample-groups of known behaviors. Furthermore, such program instructions can also be used to sequentially identify and statistically prioritize groups of samples to perform comparisons that determine whether groups of samples are better fit by a null hypothesis model or a different generative parsimonious mixture model that is associated with an alternative hypothesis that unknown behaviors or categories are present. Processor 602 and/or anomaly detection mechanism 606 can also be configured to jointly identify potentially small feature subsets that saliently characterize such putative unknown behaviors or categories.

In some embodiments of the present invention, some or all aspects of anomaly detection mechanism 606 can be implemented as dedicated hardware modules in computing device 600. These hardware modules can include, but are not limited to, processor chips, application-specific integrated circuit (ASIC) chips, field-programmable gate arrays (FPGAs), memory chips, and other programmable-logic devices now known or later developed.

Processor 602 can include one or more specialized circuits for performing the operations of the mechanisms. Alternatively, some or all of the operations of the disclosed mechanisms may be performed using general purpose circuits in processor 602 that are configured using processor instructions. Thus, while FIG. 6 illustrates anomaly detection mechanism 606 as being external to processor 602, in alternative embodiments some or all of these mechanisms can be internal to processor 602.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

REFERENCES

[U.S. Pat. No. 8,140,301] Abe, N., Jensen. D., Merugu. S., and Wong, J.-C. (Mar. 20, 2012). Method and system for causal modeling and outlier detection. U.S. Pat. No. 8,140,301.

[U.S. Pat. No. 8,474,041] Eswaran, A, and Koundinya. C. (Jun. 25, 2013). Autonomous diagnosis and mitigation of network anomalies. U.S. Pat. No. 8,474,041.

[U.S. Pat. No. 8,503,302] Golic. J, and D'Alessandro. R. (Aug. 6, 2013). Method of detecting anomalies in a communication system using numerical packet features. U.S. Pat. No. 8,503,302.

[U.S. Pat. No. 9,038,172] Miller, D. J., Kesidis. G., and Raghuram, J. (May 7, 2012). Robust anomaly detection and regularized domain adaptation of classifiers with application to Internet packet-flows. U.S. Pat. No. 9,038,172.

[Ahmed et al., 2007] Ahmed. T., Oreshkin. B., and Coates. M. (2007). Machine learning approaches to network anomaly detection. In *Proc. SysML*.

[Blei et al., 2003] Blei. David M, and Ng. Andrew Y, and Jordan, Michael I. (2003). Latent Dirichlet Allocation. Journal of Machine Learning Research 3: 993-1022.

[Casas et al., 2012] Casas, P., Mazel, J., and Owezarski, P. (2012). Knowledge-independent traffic monitoring: Unsupervised detection of network attacks. IEEE Network Magazine special issue on Network Traffic Monitoring and Analysis. 26.

[Chandola et al., 2009] Chandola. V., and Banerjee. A., and Kumar, V. (2009) Anomaly detection: A survey. *ACM Computing Surveys* (CSUR) 41: 1-58.

[Chow and Liu, 1968] Chow, C, and Liu, C. (1968) Approximating discrete probability distributions with dependence trees. IEEE Transactions on Information Theory, 14:462-467.

[Das et al., 2008] Das, K., Schneider. J., and Neill, D. B. (2008) Anomaly pattern detection in categorical datasets. Proc. of the 14th ACM SIGKDD international conference on Knowledge discovery and data mining.

[Duda et al., 2001] Duda, R., Hart, P., and Stork, D. (2001). *Pattern classification*, volume 2. Wiley, New York.

[Eskin et al., 2002] Eskin. E., Arnold. A., Prerau. M., Portnoy, L., and Stolfo, S. (2002). A geometric framework for unsupervised anomaly detection: Detecting intrusions in unlabeled data. In *Data Mining for Security Applications* (D. Barbara and S. Jajodia, Eds.).

[Feily et al., 2009] Feily, M., Shahrestani, A., and Ramadass. S. (2009). A survey of botnet and botnet detection. In *Proc. IEEE Int'l Conf. on Emerging Security Information, Systems and Technologies*, pages 268-273.

[Garcia et al., 2012] Garcia, S., Zunino, A., and Campo, M. (2012). Botnet behavior detection using using network synchronism. In *Proc. Conf on Privacy, Intrusion Detection, and Response: Technologies for Protecting Networks*.

[Graham et al., 2006] Graham, M., and Miller. D. J. (2006). Unsupervised learning of parsimonious mixtures on large spaces with integrated feature and component selection. In *IEEE Transactions on Signal Processing*. 54(4), pages 1289-1303.

[Grandvalet and Bengio, 2004] Grandvalet, Y, and Bengio, Y. (2004). Semi-supervised learning by entropy minimization. In *Proc. Neural Information Processing Systems* (*NIPS*).

[Gu et al., 2008] Gu. G., Perdisci, R., Zhang, J., and Lee, W. (2008). Botminer: Clustering analysis of network traffic for protocol- and structure-independent botnet detection. In *Proc. USENIX Security*, pages 139-154.

[Hodge & Austin. 2004] Hodge, V. J. and Austin. J. (2004) A survey of outlier detection methodologies. Artificial Intelligence Review 22(2): 85-126.

[Kocak. 2014] Kocak, F. (May 2014). *Network Traffic Analysis: Anomaly Detection and some Implications of Neutrality*. PhD thesis, Pennsylvania State University (EE Dept), University Park, Pa.

[Kocak et al., 2014] Kocak. E. Miller, D. J., and Kesidis, G. (March 2014). Detecting anomalous latent classes in a batch of network traffic flows. In Proc. Conference on Information Sciences and Systems (CISS), Princeton.

[Lakhina et al., 2004] Lakhina, A., Crovella, M., and Diot, C. (2004). Characterization of network-wide anomalies in traffic flows. In *Proc. ACM SIGCOMM Conf on Internet Measurement*, pages 201-206.

[LBNL/ICSI] LBNL/ICSI. Enterprise Tracing Project, http://www.icir.org/enterprise-tracing.

[Li et al., 2013] Li. B., Springer, J., Bebis, G., and Gunes. M. (2013). A survey of network flow applications. *Journal of Network and Control Applications,* 36(2):567-581.

[Lu et al., 2009] Lu, W., Tavallaee, M., Rammidi. G., and Ghorbani, A. (2009). Botcop: An online botnet traffic classifier. In *Proc. Communication Networks and Services Research Conference*, pages 70-77.

[Major & Riedinger, 2002] Major. J. A., and Riedinger, D. R. (2002). EFD: A Hybrid Knowledge/Statistical Based System for the Detection of Fraud. Journal of Risk and Insurance. 69(3): 309-324.

[Markley et al., 2010] Markley, S, and Miller, D. (2010). Parsimonious modeling and model order selection for multivariate Gaussian mixtures. In *IEEE Journal of Selected Topics in Signal Processing,* 4(3): 548-559.

[McCallum & Nigam, 1998] McCallum. A., and Nigam, K. (1998). A comparison of event models for naive Bayes text classifications. Proc. AAAI Workshop on Learning for Text Categorization.

[McFowland et al., 2013] McFowland, E., Speakman, S., and Neill, D. (2013) Fast generalized subset scan for anomalous pattern detection. *Journal of Machine Learning Research*, vol. 14, no. 1, pp. 1533-1561.

[Miller et al., 2012a] Miller, D., Kocak., F., and Kesidis, G. (September 2012). Sequential anomaly detection in a batch with growing number of tests: Applications to network intrusion detection. In *Proc. IEEE MLSP*, Santander.

[Miller et al., 2012b] Miller, D., Natraj. A., Hockenbury, R., Dunn, K., Sheffler. M., and Sullivan, K. (2012b). Anomaly detection driven active learning for identifying suspicious tracks and events in wami video. In *SPIE Conf. on Defense, Security, and Sensing*, pages 840207-840207.

[Muandet and Scholkopf, 2013] Muandet, K., and Schölkopf. B. (2013). One-class support measure machines for group anomaly detection. *Proc. 29th Conference on Uncertainty in Artificial Intelligence.*

[Nguyen and Armitage. 2008] Nguyen. T, and Armitage. G. (2008). A survey of techniques for Internet traffic classification using machine learning. *IEEE Communications Surveys and Tutorials.* 10(4).

[Parker et al., 2010] Parker. R., Melathopoulos. A., White, R., Pernal, S., Guarna, M., and Foster, L. (2010). Ecological adaptation of diverse honey bee (*Apis Mellifera*) populations. *PLOS ONE,* 5(6).

[Portnoy et al., 2001] Portnoy. L., Eskin., E., and Stolfo. S. (2001). Intrusion detection with unlabeled data using clustering. In *Proc. ACM CSS Workshop on Data Mining Applied to Security (DMSA)*, pages 5-8, Philadelphia, Pa.

[Qiu et al., 2014] Qiu, Z., Miller, D., Stieber, B., and Fair, T. (2014). Actively learning to distinguish suspicious from innocuous anomalies in a batch of vehicle tracks. In *Proc. SPIE.*

[Qiu et al., 2015] Qiu, Z., Miller. D. J., and Kesidis, G. (2015) Detecting Clusters of Anomalies on Low-Dimensional Feature Subsets with Application to Network Traffic Flow Data. In *Proc. IEEE MLSP.* Boston.

[Qiu et al., 2017b] Qiu. Z., Miller, D. J., and Kesidis. G. (2017). A Maximum Entropy Framework for Semisupervised and Active Learning with Unknown or Label-Scarce Categories. *IEEE Trans. on Neural Networks and Learning Systems (TNNLS).*

[Qiu et al., 2017a] Qiu, Z., Miller, D. J., and Kesidis, G. (2017). Flow based botnet detection through semi-supervised active learning. In *Proc. IEEE ICASSP.*

[Rahbarinia et al., 2013] Rahbarinia, B., Perdisci. R., Lanzi, A., and Li, K. (2013). PeerRush: Mining for Unwanted P2P Traffic. In *Proc. Conf on Detection of Intrusions and Malware, and Vulnerability Assessment.* Springer LNCS 7967.

[Ramaswamy et al., 2000] Ramaswamy. S., Rastogi, R., and Shim. K. (2000). Efficient algorithms for mining outliers from large data sets. In *Proc. ACM SIGMOD Conference,* pages 427-438, Dallas, Tex.

[Saad et al., 2011] Sand, S., Traore, I., Ghorbani, A., Sayed, B., Zhao. D., Lu, W., Felix. J., and Hakimian, P. (July 2011). Detecting P2P botnets through network behavior analysis and machine learning. In *Proc. Conference on Privacy, Security and Trust,* Montreal.

[Schwarz. 1978] Schwarz. G. (1978) Estimating the dimension of a model. Annals of Stats 6: 461-464.

[Shan and Wang. 2014] Shan, Z, and Wang, X. (2014). Growing grapes in your computer to defend against malware. *IEEE Transactions on Information Forensics and Security,* 9(2).

[Shin et al., 2005] Shin, H., Eom, D., and Kim, S. (2005). One-class support vector machines an application in machine fault detection and classification. *Computers & Industrial Engineering,* 48(2):395-408.

[Soleimani et al., 2015] Soleimani, H., and Miller, D. J. (2015) Parsimonious topic models with salient word discovery. In *IEEE Transactions on Knowledge and Data Engineering,* 27(3): 824-837.

[Soleimani et al., 2016] Soleimani, H., and Miller. D. J. (2016) ATD: Anomalous topic discovery in high-dimensional discrete data. *IEEE Transactions on Knowledge and Data Engineering.*

[Sommer and Paxson, 2010] Sommer, R, and Paxson, V. (2010). Outside the Closed World: On Using Machine Learning For Network Intrusion Detection. In *Proc. IEEE Symposium on Security and Privacy.*

[Sotiris et al., 2010] Sotiris, V., Tse, P., and Pecht, M. (2010). Anomaly detection through a bayesian support vector machine. *IEEE Transactions on Reliability,* 59(2).

[Sourcefire] Sourcefire. VRT Labs—Zeus Trojan Analysis. http://labs.snort.org/papers/zeus/html.

[Srivatava & Kundu. 2008] Srivastava, A., and Kundu, A. (2008) Credit card fraud detection using hidden Markov model. IEEE Transactions on Dependable and Secure Computing. 5(1): 37-48.

[Vapnik 1995] Vapnik, V. N. (1995) The Nature of Statistical Learning Theory. Springer-Verlag New York, Inc., New York, N.Y., USA.

[Wang & Stolfo, 2004] Wang. K., and Stolfo, S. J. (2004) Anomalous payload-based network intrusion detection. *Proc. Recent Advances in Intrusion Detection.* pages 203-222.

[Wang et al., 2011] Wang, K., Huang. C.-Y., Lin, S.-J., and Lin. Y.-D. (2011). A fuzzy pattern-based filtering algorithm for botnet detection. *Computer Networks,* 55:3275-3286.

[Wong. 2002] Wong, W., Moore, A., Cooper, G., and Wagner, M. "Rule-based anomaly pattern detection for detecting disease outbreaks," 2002.

[Wong et al., 2003] Wong. W., Moore, A., Cooper. G., and Wagner. M. "Bayesian network anomaly pattern detection for disease outbreaks," 2003.

[Wurzinger et al., 2009] Wurzinger, P., Bilge, L., Holz. T., Goebel, J., Kruegel. C., and Kirda, E. (2009). Automatically generating models for botnet detection. In *Proc. European Conf on Research in Computer Security (ES-ORICS).*

[Xiong et al., 2011a] Xiong, L., Barnabi. S. P., Schneider, J. G., Connolly, A., and Jake. V. (2011) Hierarchical probabilistic models for group anomaly detection. *Proc. International Conference on Artificial Intelligence and Statistics.* pp. 789-797.

[Xiong et al., 2011b] Xiong, L, and Póczos. B, and Schneider, J. G. (2011) Group anomaly detection using flexible genre models. *Advances in neural information processing systems.*

[Yu et al., 2014] Yu. R., He, X., and Liu, Y. (2014). GLAD: Group Anomaly Detection in Social Media Analysis. *Proc. Proceedings of the 20th ACM SIGKDD international conference on Knowledge discovery and data mining,* pp. 372-381.

[Zeidanloo et al., 2010] Zeidanloo. H., Manaf. A., Vahdani. P., Tabatabaei. F., and Zamani, M. (2010). Botnet detection based on traffic monitoring. In *Proc. Int'l Conf. on Networking and Information Technology (ICNIT).*

[Zhang et al., 2014] Zhang, J., Perdisci, R., Lee, W., Luo, X., and Sarfraz, U. (2014). Building a scalable system for stealthy P2P-botnet detection. *IEEE Trans. on Information Forensics and Security,* 9(1).

What is claimed is:

1. A computer-implemented method for detecting anomalies in batches of data samples, comprising:

receiving a training set of labeled samples of network packet flows that represent known categories for clustered groups of samples;

determining, based on the training set, a sparse null mixture model that characterizes groups of samples into a set of known categories, wherein each specific category is associated with a distinct group of samples and a set of group-specific salient features that uniquely characterize that distinct group;

receiving a batch of unlabeled samples of network packet flows;

determining, based on the batch of unlabeled samples, a second mixture model that assumes that an unknown category that is not present in the training set is present in the batch of unlabeled samples and penalizes a set of probability weights for the known categories from the sparse null mixture model;

sequentially calculating and summing probabilities for the batch of unlabeled samples using the sparse null mixture model to determine a first probability sum and sequentially calculating and summing probabilities for the batch of unlabeled samples using the second mixture model to determine a second probability sum;

comparing the first probability sum and the second probability sum to determine whether the batch includes a clustered group of samples that are associated with the unknown category and represent a previously-unidentified anomaly in the batch of unlabeled samples of network packet flows that indicates a security risk associated with an attack; and outputting the result of the comparison to indicate at least one of a presence or a lack of the unknown category in the batch.

2. The computer-implemented method of claim 1, wherein comparing the first probability and the second probability further comprises determining that the first probability is less than the second probability, which indicates that the second mixture model more accurately describes the clustering in the batch of unlabeled samples than the sparse null mixture model and that the unknown category exists in the batch of unlabeled samples; and wherein outputting the result further comprises alerting a presence of the previously-unidentified anomaly and outputting (1) the clustered group of samples in the batch that comprise the unknown category and (2) a specific feature subset that distinctly characterizes the clustered group of samples and distinguishes the clustered group of samples from the other clustered groups of samples in the second mixture model.

3. The computer-implemented method of claim 1, wherein comparing the first probability and the second probability further comprises determining that the first probability is not less than the second probability and outputting the result further comprises outputting that no unknown categories exist in the batch of unlabeled samples and hence that all of the batch of unlabeled samples comprise known categories of network data flows that are described in the training set.

4. A non-transitory computer-readable storage medium storing instructions that when executed by a computer cause the computer to perform a method for detecting anomalies in batches of data samples, the method comprising:

receiving a training set of labeled samples of network packet flows that represent known categories for clustered groups of samples;

determining, based on the training set, a sparse null mixture model that characterizes groups of samples into a set of known categories, wherein each specific category is associated with a distinct group of samples and a set of group-specific salient features that uniquely characterize that distinct group;

receiving a batch of unlabeled samples of network packet flows;

determining, based on the batch of unlabeled samples, a second mixture model that assumes that an unknown category that is not present in the training set is present in the batch of unlabeled samples and penalizes a set of probability weights for the known categories from the sparse null mixture model;

sequentially calculating and summing probabilities for the batch of unlabeled samples using the sparse null mixture model to determine a first probability sum and sequentially calculating and summing probabilities for the batch of unlabeled samples using the second mixture model to determine a second probability sum;

comparing the first probability sum and the second probability sum to determine whether the batch includes a clustered group of samples that are associated with the unknown category and represent a previously-unidentified anomaly in the batch of unlabeled samples of network packet flows that indicates a security risk associated with an attack; and outputting the result of the comparison to indicate at least one of a presence or a lack of the unknown category in the batch.

5. An anomaly-detection system that detects anomalies in batches of data samples, comprising:

a processor;

a storage mechanism; and an anomaly detection mechanism;

wherein at least one of the anomaly-detection system and the processor are configured to:

receive a training set of labeled samples of network packet flows that represent known categories for clustered groups of samples, wherein the training set is stored in the storage mechanism;

determine, based on the training set, a sparse null mixture model that characterizes groups of samples into a set of known categories, wherein each specific category is associated with a distinct group of samples and a set of group-specific salient features that uniquely characterize that distinct group;

receive a batch of unlabeled samples of network packet flows, wherein the batch of unlabeled samples are stored in the storage mechanism;

determine, based on the batch of unlabeled samples, a second mixture model that assumes that an unknown category that is not present in the training set is present in the batch of unlabeled samples and penalizes a set of probability weights for the known categories from the sparse null mixture model;

sequentially calculate and sum probabilities for the batch of unlabeled samples using the sparse null mixture model to determine a first probability sum and sequentially calculate and sum probabilities for the batch of unlabeled samples using the second mixture model to determine a second probability sum;

compare the first probability sum and the second probability sum to determine whether the batch includes a clustered group of samples that are associated with the unknown category and represent a previously-unidentified anomaly in the batch of unlabeled samples of network packet flows that indicates a security risk associated with an attack; and output the result of the comparison to indicate at least one of a presence or a lack of the unknown category in the batch.

\* \* \* \* \*